United States Patent
Baghel et al.

(10) Patent No.: US 11,617,160 B2
(45) Date of Patent: Mar. 28, 2023

(54) RECLAIMING RESOURCES BASED ON SIDELINK FEEDBACK

(71) Applicant: QUALCOMM Incorporated, San Diego, CA (US)

(72) Inventors: Sudhir Kumar Baghel, Hillsborough, NJ (US); Tien Viet Nguyen, Bridgewater, NJ (US); Kapil Gulati, Belle Mead, NJ (US); Gabi Sarkis, San Diego, CA (US); Shuanshuan Wu, San Diego, CA (US); Chang-Sik Choi, Hillsborough, NJ (US); Anantharaman Balasubramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/090,449

(22) Filed: Nov. 5, 2020

(65) Prior Publication Data

US 2021/0144682 A1 May 13, 2021

Related U.S. Application Data

(60) Provisional application No. 62/932,874, filed on Nov. 8, 2019.

(51) Int. Cl.
*H04W 72/04* (2009.01)
*H04W 72/02* (2009.01)
(Continued)

(52) U.S. Cl.
CPC .......... *H04W 72/02* (2013.01); *H04L 5/0055* (2013.01); *H04W 4/40* (2018.02); *H04W 24/08* (2013.01); *H04W 28/26* (2013.01); *H04W 72/10* (2013.01)

(58) Field of Classification Search
None
See application file for complete search history.

(56) References Cited

U.S. PATENT DOCUMENTS

2021/0007096 A1* 1/2021 Huang ............... H04W 72/02

OTHER PUBLICATIONS

Fraunhofer Hhi, et al., "Resource Allocation for Mode 2 NR V2X", 3GPP Draft, R2-1915555, 3GPP TSG-RAN WG2 Meeting #108, 3rd Generation Partnership Project (3GPP), Mobile Competence Centre, 650, Route Des Lucioles, F-06921 Sophia-Antipolis Cedex, France, vol. RAN WG2, No. Reno, USA, Nov. 18, 2019-Nov. 22, 2019, Nov. 7, 2019 (Nov. 7, 2019), XP051815972, 8 Pages, Retrieved from the Internet: URL:https://ftp.3gpp.org/tsg_ran/WG2_RL2/TSGR2_108/Docs/R2-1915555.zip, R2-1915555.docx [retrieved on Nov. 7, 2019] pp. 2-5, 2 Mode 2 Resource Pool Configurations pp. 5-7, 3 Mode 2 Resource Selection Procedures.

(Continued)

*Primary Examiner* — Willie J Daniel, Jr.
(74) *Attorney, Agent, or Firm* — Danai Nelisile Mhembere; Holland & Hart LLP

(57) ABSTRACT

Methods, systems, and devices for wireless communications are described. The described techniques relate to the categorization of resources in a system to enable a user equipment (UE) to determine whether resources may be reclaimed. At least two categories may be defined for the resources, and the UE may use various criteria for categorizing the resources in a system. For example, the UE may include a first set of resources in an "available" category and a second set of resources in an "occupied" category. Resources in the "occupied" category may be indicated as occupied by another UE's sidelink channel information. In cases where resources are indicated as reserved for retransmission by another UE, but no feedback is detected, then the UE may use additional parameters to determine whether (Continued)

those resources may be reclaimed for its own transmission and may categorize the resources accordingly.

30 Claims, 13 Drawing Sheets

(51) Int. Cl.
  *H04W 24/08* (2009.01)
  *H04W 4/40* (2018.01)
  *H04L 5/00* (2006.01)
  *H04W 28/26* (2009.01)
  *H04W 72/10* (2009.01)

(56) References Cited

OTHER PUBLICATIONS

International Search Report and Written Opinion—PCT/US2020/059430—ISA/EPO—dated Jan. 28, 2021.

ITL: "Discussion on NR V2X HARQ Mechanism", 3GPP Draft, 3GPP TSG RAN WG1 Ad-Hoc Meeting 1901, R1-1901146_V2X_HARQ Procedure, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25,2019, Jan. 20, 2019 (Jan. 20, 2019), XP051593990, pp. 1-5, Retrieved from the Internet: URL:http://www.3gpp.org/ftp/Meetings%5F3GPP%5FSYNC/RAN1/Docs/R1%2D1901146%2Ezip. [retrieved on Jan. 20, 2019] paragraph [0002]-paragraph [0004],the Whole Document.

NEC: "Mode 2 Resource Allocation Mechanism for NR Sidelink", 3GPP Draft, R1-1911028, 3GPP TSG RAN WG1 #98bis, Mode 2 Resource Allocation Mechanism for NR Sidelink, 3rd Generation Partnership Project (3GPP), Mobile Competence Centre, 650, Route Des Lucioles, F-06921 Sophia-Antipolis Ce, vol. Ran WG1, No. Chongqing, China, Oct. 10, 2019-Oct. 20, 2019, Oct. 8, 2019 (Oct. 8, 2019), XP051809253, 5 Pages, Retrieved from the Internet: URL:https://ftp.3gpp.org/tsg_ran/WG1_RL1/TSGR1_98b/Docs/R1-1911028.zip, R1-1911028 Mode-2 Resource Allocation Mechanism for NR sidelink.docx [retrieved on Oct. 8, 2019] the Whole Document.

Qualcomm Incorporated: "Sidelink Resource Allocation Mechanism for NR V2X",3GPP Draft, R1-1911106, 3GPP TSG-RAN WG1 #98bis, Sidelink Resource Allocation Mechanism for NR V2X, 3rd Generation Partnership Project (3GPP), Mobile Competence Centre, 650, Route Des Lucioles, F-06921 Sophia-Antipolis Cedex, vol. Ran WG1, No. Chongqing, China, Oct. 14, 2019-2019102, Oct. 8, 2019 (Oct. 8, 2019), XP051809282, 10 Pages, Retrieved from the Internet: URL:https://ftp.3gpp.org/tsg_ran/WG1_RL1/TSGR1_98b/Docs/R1-1911106.zip, R1-1911106_Sidelink Resource Allocation Mechanism for NR V2X.docx [retrieved on Oct. 8, 2019] the Whole Document.

VIVO: "Discussion on Resource Allocation Mechanism for NR V2X", 3GPP Draft, R1-1900120, 3GPP TSG RAN WG1 Ad-Hoc Meeting 1901, Discussion on Resource Allocation Mechanism for NR Final, 3rd Generation Partnership Project (3GPP), Mobile Competence Centre, 650, Route Des Lucioles, F-06921 Sophia-Antipolis, vol. RAN WG1, No. Taipei, Jan. 21, 2019-Jan. 25, 2019, Jan. 12, 2019 (Jan. 12, 2019), XP051575744, 9 pages, Retrieved from the Internet: URL:http://www.3gpp.org/ftp/tsg%5Fran/WG1%5FRL1/TSGR1%5FAH/NR%5FAH%5F1901/Docs/R1%2D1900120%2Ezip, [retrieved on Jan. 12, 2019] paragraph [0001]-paragraph [0003], pp. 1-6.

\* cited by examiner

RECLAIMING RESOURCES BASED ON SIDELINK FEEDBACK

CROSS REFERENCE

The present application for patent claims the benefit of U.S. Provisional Patent Application No. 62/932,874 by Baghel et al., entitled "RECLAIMING RESOURCES BASED ON SIDELINK FEEDBACK," filed Nov. 8, 2019, assigned to the assignee hereof, and expressly incorporated by reference herein in its entirety.

FIELD OF TECHNOLOGY

The following relates generally to wireless communications and more specifically to reclaiming resources based on sidelink feedback.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless systems may support sidelink communications (e.g., vehicle-to-vehicle (V2V), vehicle-to-everything (V2X) systems, or the like), where a UE may communicate with other UEs on allocated sidelink resources. However, techniques for reclaiming unused resources may be desired for ensuring efficient radio frequency spectrum usage within the system.

SUMMARY

The described techniques relate to improved methods, systems, devices, and apparatuses that support reclaiming resources based on sidelink feedback. Generally, the described techniques provide for the categorization of resources in a system to enable a user equipment (UE) to determine if resources may be reclaimed for the UE's own transmission. The resources may be sidelink resources used by devices in a vehicle-to-everything (V2X) system. At least two categories may be defined for the resources, and the UE may use various criteria to categorize the resources. For example, the UE may define an "available" category for a first set of available resources that were not previously indicated as occupied (e.g., per a previously-received sidelink channel information (SCI) from another UE). The resources in the "available" category may have a reference signal received power (RSRP) that satisfies a predefined threshold or may satisfy other criteria. The UE may further define an "occupied" category for a second set of resources in that may be indicated as occupied by another UE's SCI. The "occupied" category may include resources designated as retransmission resources allocated by the other UE (e.g., resources designated for the other UE's retransmission(s)). In addition, the UE may determine that negative acknowledgment (NACK) feedback was detected for a corresponding transmission of a packet associated with the other UE's SCI. The NACK may indicate that the resources are not available for assignment (and are being used for retransmission by that other UE) and the retransmission resources may therefore be included in the "occupied" category.

In cases where a set of resources are indicated as reserved for retransmission by another UE's SCI, but NACK feedback is not detected, the UE may use additional parameters to determine whether those resources may be reclaimed for the UE's own transmission, and the UE may categorize the resources accordingly (e.g., available or occupied). As an example, if NACK feedback is not detected, then the UE may determine if the priority of the other UE's packet is equal to or less than the priority of the UE's own packet. If so, the UE may consider the resources as "available," and the resources may be used for the transmission of the UE's packet. However, if the priority of the other UE's packet is higher than the priority of the UE's own packet, then the resources may be considered "occupied," and the UE may allocate other resources for transmitting its packet. The use of the packet priority may mitigate issues in the event that the UE missed the detection of feedback information for the other UE's packet (or if no feedback was transmitted from an additional UE communicating with the other UE). Further, in the event an acknowledgment (ACK) is detected by the UE, then the resources allocated by the other UE for retransmission may be available (e.g., because the initial packet may not undergo retransmission), and the UE may categorize such resources as "available."

A method of wireless communications at a first UE is described. The method may include receiving, by the first UE, SCI indicating one or more resources reserved for retransmission of a first packet by a second UE, monitoring for sidelink feedback information that is responsive to an initial transmission of the first packet by the second UE, identifying a category of the one or more resources based on whether the sidelink feedback information is detected during the monitoring, and allocating, by the first UE, a set of resources for transmission of a second packet, where the one or more resources are included in the set of resources based on the identified category of the one or more resources.

An apparatus for wireless communications at a first UE is described. The apparatus may include a processor, memory coupled with the processor, and instructions stored in the memory. The instructions may be executable by the processor to cause the apparatus to receive, by the first UE, SCI indicating one or more resources reserved for retransmission of a first packet by a second UE, monitor for sidelink feedback information that is responsive to an initial transmission of the first packet by the second UE, identify a category of the one or more resources based on whether the sidelink feedback information is detected during the monitoring, and allocate, by the first UE, a set of resources for transmission of a second packet, where the one or more resources are included in the set of resources based on the identified category of the one or more resources.

Another apparatus for wireless communications at a first UE is described. The apparatus may include means for receiving, by the first UE, SCI indicating one or more resources reserved for retransmission of a first packet by a second UE, monitoring for sidelink feedback information that is responsive to an initial transmission of the first packet by the second UE, identifying a category of the one or more resources based on whether the sidelink feedback information is detected during the monitoring, and allocating, by the first UE, a set of resources for transmission of a second packet, where the one or more resources are included in the set of resources based on the identified category of the one or more resources.

A non-transitory computer-readable medium storing code for wireless communications at a first UE is described. The code may include instructions executable by a processor to receive, by the first UE, SCI indicating one or more resources reserved for retransmission of a first packet by a second UE, monitor for sidelink feedback information that is responsive to an initial transmission of the first packet by the second UE, identify a category of the one or more resources based on whether the sidelink feedback information is detected during the monitoring, and allocate, by the first UE, a set of resources for transmission of a second packet, where the one or more resources are included in the set of resources based on the identified category of the one or more resources.

Some examples of the method, apparatuses, and non-transitory computer-readable medium described herein may further include operations, features, means, or instructions for determining an absence of the sidelink feedback information based on the monitoring, where identifying the category may be based on the absence of the sidelink feedback information.

Some examples of the method, apparatuses, and non-transitory computer-readable medium described herein may further include operations, features, means, or instructions for identifying a first priority of the first packet, and identifying a second priority of the second packet, where identifying the category of the one or more resources may be based on a comparison of the first priority and the second priority.

Some examples of the method, apparatuses, and non-transitory computer-readable medium described herein may further include operations, features, means, or instructions for identifying that the first priority may be equal to the second priority based on the comparison, and transmitting the second packet using the one or more resources based on the first priority being equal to the second priority and allocating the set of resources to include the one or more resources.

Some examples of the method, apparatuses, and non-transitory computer-readable medium described herein may further include operations, features, means, or instructions for identifying that the first priority may be less than the second priority based on the comparison, and transmitting the second packet using the one or more resources based on the first priority being less than the second priority and allocating the set of resources to include the one or more resources.

Some examples of the method, apparatuses, and non-transitory computer-readable medium described herein may further include operations, features, means, or instructions for determining that the first priority may be higher than the second priority, and transmitting the second packet using the set of resources, where the set of resources may be allocated to exclude the one or more resources based on the first priority being higher than the second priority.

In some examples of the method, apparatuses, and non-transitory computer-readable medium described herein, the sidelink feedback information includes a negative acknowledgment.

Some examples of the method, apparatuses, and non-transitory computer-readable medium described herein may further include operations, features, means, or instructions for detecting the sidelink feedback information based on the monitoring, where identifying the category may be based on the detected sidelink feedback information.

Some examples of the method, apparatuses, and non-transitory computer-readable medium described herein may further include operations, features, means, or instructions for transmitting the second packet using the set of resources, where the set of resources may be allocated to exclude the one or more resources based on the detected sidelink feedback information.

In some examples of the method, apparatuses, and non-transitory computer-readable medium described herein, the sidelink feedback information includes a negative acknowledgment.

Some examples of the method, apparatuses, and non-transitory computer-readable medium described herein may further include operations, features, means, or instructions for transmitting the second packet using the one or more resources based on the detected sidelink feedback information and allocating the set of resources to include the one or more resources.

In some examples of the method, apparatuses, and non-transitory computer-readable medium described herein, the sidelink feedback information includes a positive acknowledgment.

Some examples of the method, apparatuses, and non-transitory computer-readable medium described herein may further include operations, features, means, or instructions for detecting that an RSRP associated with the one or more resources may be below a configured threshold, and transmitting the second packet using the one or more resources based on the detected reference signal received power and allocating the set of resources to include the one or more resources.

In some examples of the method, apparatuses, and non-transitory computer-readable medium described herein, monitoring for the sidelink feedback information may include operations, features, means, or instructions for monitoring a physical sidelink feedback channel for the sidelink feedback information transmitted to the second UE.

In some examples of the method, apparatuses, and non-transitory computer-readable medium described herein, the category of the one or more resources includes an available category or an occupied category.

In some examples of the method, apparatuses, and non-transitory computer-readable medium described herein, the first UE and the second UE operate in a vehicle-to-everything system.

DETAILED DESCRIPTION

Figure 1:
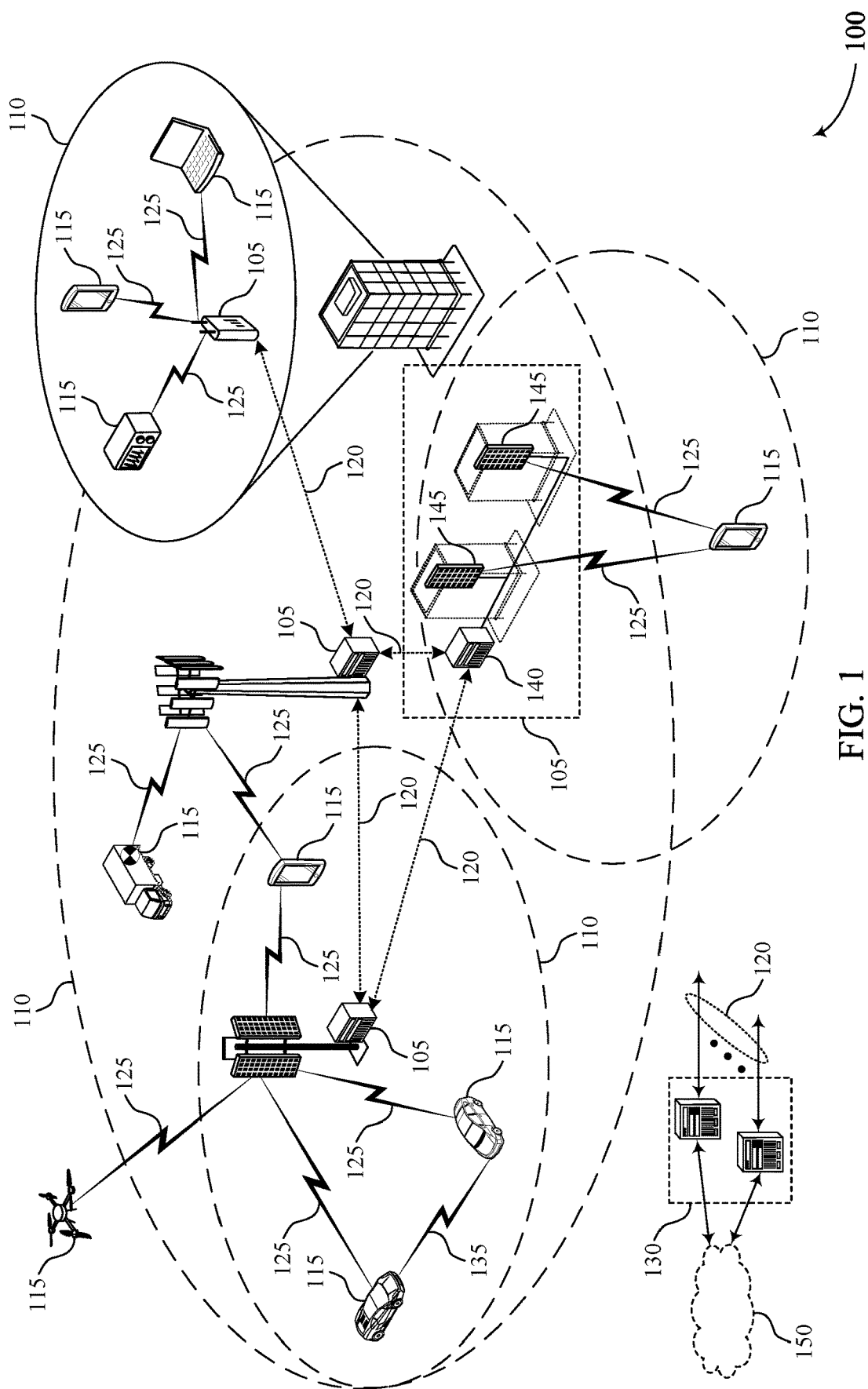
FIGS. 1 and 2 illustrate examples of wireless communications systems in accordance with aspects of the present disclosure.

A user equipment (UE) may be capable of directly communicating with other UEs via sidelink communications. For example, the UE may communicate with a second UE via sidelink in a vehicle-to-everything (V2X) system. In some cases, the UE may implement a feedback process (e.g., a hybrid automatic repeat request (HARQ) process) to increase the reliability of communications between the UE and another sidelink devices. For example, when a device transmits data to the UE, the UE may send information to the transmitting device about the reception status of the data, such as an indication of whether the data was successfully decoded. This type of information may be referred to as feedback or HARQ feedback. In some cases, a UE may reserve future sidelink resources for retransmission in preparation for unsuccessful reception or decoding of a transmission (e.g., by another device or UE). In the case of sidelink communications, feedback for transmissions on the sidelink may be transmitted using a physical sidelink feedback channel (PSFCH).

According to the techniques described herein, a UE may attempt to reclaim unused sidelink resources previously indicated as reserved for possible retransmissions by other UEs. In some cases, a UE may categorize sidelink resources to determine if the resources may be used in resource selection. For example, a resource may be free or available in cases when no sidelink channel information (SCI) indicates that the resources would be occupied, or in cases when the UE measures that a reference signal received power (RSRP) is below configured threshold. A UE may categorize a resource as occupied for retransmission when a reservation is indicated by SCI and a negative acknowledgment (NACK) is detected for the corresponding initial transmission.

Additionally, a UE may configure parameters to determine a categorization of sidelink resources when no feedback is detected for previously reserved resources indicated by SCI. In some examples, the UE may receive an SCI and determine from the SCI that a set of resources is reserved for retransmission of an initial transmission by another UE. The UE may then monitor for, but not detect NACK, on the PSFCH. Based on not detecting NACK for the resources, the UE may compare the priority of the initial packet (to be retransmitted) by the other UE with the packet the UE would like to transmit on the reclaimed resources. If the reclaiming UE's packet has a priority equal to or higher than the packet for retransmission by the other UE, then the resources may be reclaimed for transmission. Otherwise, when the reclaiming UE's packet has a priority lower than the priority of the packet for retransmission by the other UE, then the resources may not be reclaimed. Accordingly, UEs may improve resource utilization in sidelink communications by properly reclaiming resources for additional transmissions that would otherwise be wasted system resources.

Aspects of the disclosure are initially described in the context of wireless communications systems. Aspects of the disclosure are further illustrated by and described with reference to apparatus diagrams, system diagrams, and flowcharts that relate to reclaiming resources based on sidelink feedback.

FIG. 1 illustrates an example of a wireless communications system 100 in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof. Wireless communications system 100 may support reclaiming resources based on sidelink feedback to enhance resource utilization and efficiency in the system.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/$ ($\Delta f_{max} \cdot N_f$) seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using V2X communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval. During sidelink operations, HARQ feedback may be transmitted via a PSFCH.

Wireless communications system 100 may be a distributed systems where UEs 115 monitor for and receive packets from one or more other UEs 115. For example, while two UEs 115 communicate with each other, a third UE 115 may be capable of monitoring transmissions between the two UEs 115. Additionally, such systems may support the use of feedback information (e.g., ACK/NACK) sent via a PSFCH to indicate whether packets were successfully received and decoded. A transmitting UE 115 may therefore reserve (e.g., using SCI) one or more additional resources for retransmission in the event an initially-transmitted packet is not received or not properly decoded.

The resources reserved for retransmission, however, may not be utilized, particularly in cases where the initial transmission of a packet was successfully received and decoded at a receiving UE 115. In such cases, other UEs 115 may have difficulty effectively reclaiming these unused resources. Specifically, a UE 115 monitoring for PSFCH transmissions including feedback information may not detect the PSFCH, or the PSFCH may not be transmitted. As such, the absence of feedback may not clearly indicate whether resources that were previously reserved for retransmission are available. Thus, techniques to further assist a UE 115 in determining whether retransmission resources are available to be reclaimed may be desirable.

UE 115 may determine if resources may be reclaimed for a transmission by the UE 115 through categorizing the resources and optionally evaluating the priority of the transmission relative to the priority of a retransmission scheduled for the resources. In some examples, the resources are sidelink resources, for example, on communication link 135, used by UEs 115 in a V2X system. At least two categories may be defined for the resources, and the UE 115 may use various conditions to categorize the resources. For example, the UE 115 may define an "available" category for a first set of resources that were not previously indicated as occupied (e.g., per a previously-received SCI from another UE 115). The resources in this group may also have an RSRP falls below a predefined threshold or may satisfy other criteria. The UE 115 may define an "occupied" category for a second set of resources in that may be indicated as occupied by another UE's 115 SCI which, for example, may include resources designated as retransmission resources allocated by the other UE 115.

Additionally or alternatively, the UE 115 may determine that feedback (e.g., ACK or NACK) was detected for a corresponding transmission of a packet associated with the other UE's 115 SCI. For instance, if UE 115 detected a NACK, the feedback may indicate that the resources are not available to be reclaimed by UE 115 (and may be used for retransmission by the other UE 115) and are therefore included in the "occupied" category.

In cases where a set of resources are indicated as reserved for retransmission by another UE's 115 SCI, but no NACK feedback is detected by the UE 115 attempting to reclaim the resources, the reclaiming UE 115 may use additional parameters to determine if the resources may be reclaimed for its own transmission and may categorize the resources accordingly (e.g., in the available or occupied category). For example, if no NACK feedback is detected, then the reclaiming UE 115 may determine if the priority of the other UE's 115 retransmission is equal to or less than the priority of the UE's 115 own transmission or retransmission. If so, the UE 115 may consider the resources as "available," and the resources may be used for the transmission of the UE's 115 packet. However, if the priority of the other UE's 115 retransmission is higher than the priority of the UE's 115 own transmission or retransmission, then the resources may be considered "occupied," and the UE 115 may allocate other resources for transmitting its packet. The use of the packet priority may help to mitigate issues in the event that the UE 115 was unable to detect the feedback information on the PSFCH for the other UE's 115 packet (or if no feedback was transmitted from the receiving UE 115). Further, in the event an ACK is detected by the UE 115, then the resources allocated by the other UE 115 for retransmission may be available (e.g., because the initial packet may not undergo retransmission), and the UE 115 may categorize such resources as "available."

Figure 2:
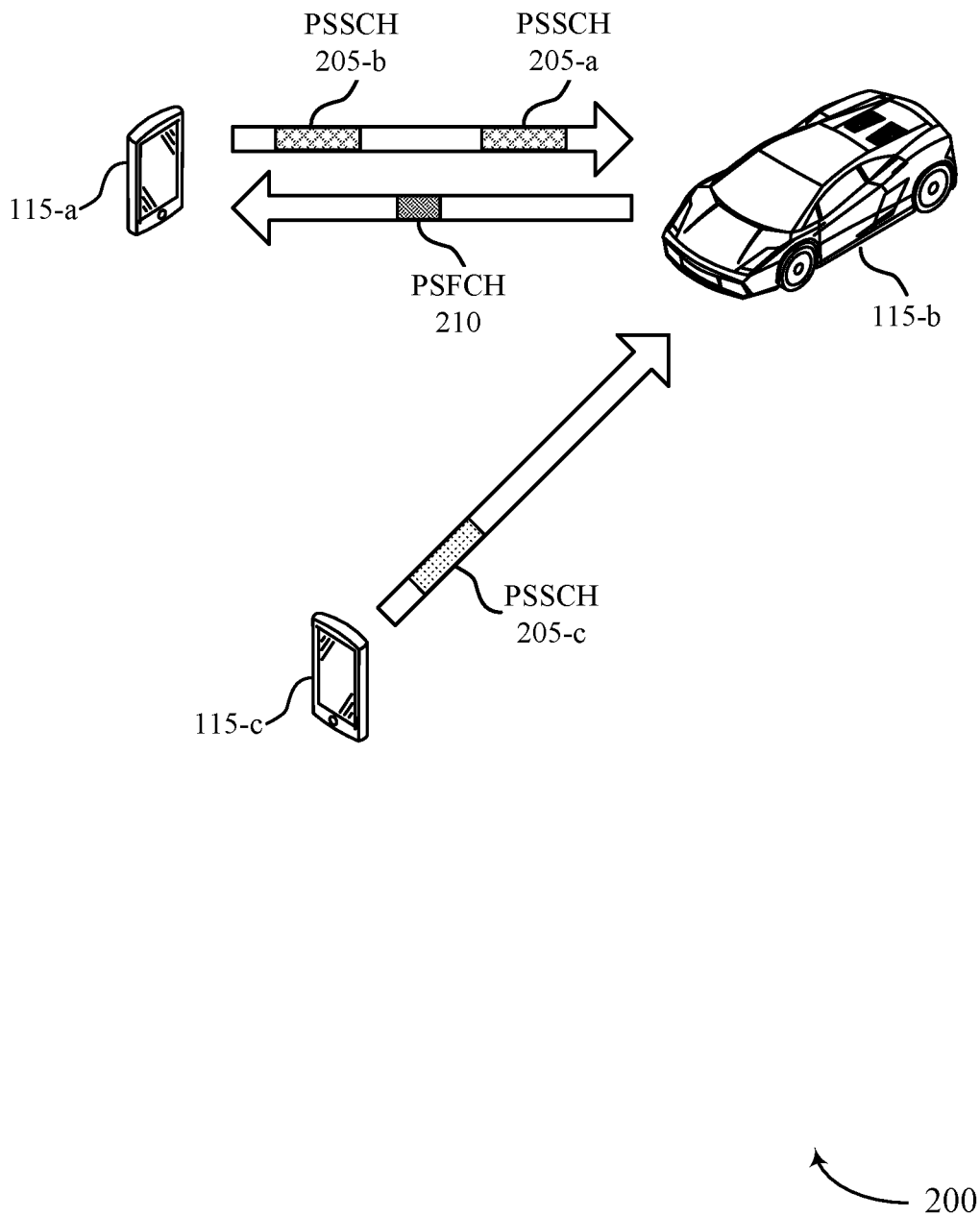

FIG. 2 illustrates an example of a wireless communications system 200 in accordance with aspects of the present disclosure. In some examples, wireless communications system 200 may implement aspects of wireless communications system 100. Wireless communications system 200 may be a new radio V2X system and may include UEs 115-*a*, 115-*b*, and 115-*c*, which may be examples of UE 115, as described with reference to FIG. 1. UEs 115-*a*, 115-*b*, and 115-*c* may be able to reclaim sidelink resources on a physical sidelink shared channel (PSSCH) 205 based on whether feedback for the sidelink resources is detected on a physical sidelink feedback channel (PSFCH) 210.

Similar to Uu communications (base station 105 to UE 115), sidelink communications may involve HARQ feedback processes for reliability purposes. For example, UE 115-*a* may receive HARQ feedback for a sidelink transmission conveyed to UE 115-*b* in the PSSCH 205-*a*. The sidelink transmission may be a unicast transmission intended for a single UE 115 (e.g., UE 115-*b*) or a multicast or groupcast transmission intended for multiple receiving UEs 115. In some cases, the physical sidelink control channel (PSCCH) may be used to indicate the PSSCH resources used to carry the sidelink transmission. The HARQ feedback for PSSCH 205-a may be conveyed in the PSFCH 210.

UEs 115 in wireless communications system 200 may be distributed throughout the system and communicate via sidelink, such that each UE 115 may attempt to monitor and receive packets from many other UEs 115 via sidelink. For example, when UE 115-b receives packets successfully via a PSSCH 205-a from UE 115-a, UE 115-b may send an ACK on a PSFCH 210 to UE 115-a. Additionally, when UE 115-b receives packets incorrectly or is unable to decode a packet received via a PSSCH 205-a from UE 115-a, UE 115-b may send a NACK on a PSFCH 210 to UE 115-a.

In a new radio V2X system, a transmitting UE 115 (e.g., UE 115-a) may reserve extra resources (around 2 to 4 extra) for its possible retransmissions indicated to one or more sidelink UEs 115 via SCI. This reservation mechanism may improve the system performance; however, it may also create resource over booking issues that may result in degradation in preformation in some cases, such as when reserved resources are not used for retransmission and not released for other UEs 115. For example, UE 115-a may reserve resources (e.g., time/frequency resources) on PSSCH 205-b for retransmission of the packets on PSSCH 205-a in examples where PSSCH 205-a may not be received successfully by UE 115-b. The resources on PSSCH 205-b may be used for retransmission when NACK is received by UE 115-a on PSFCH 210. In some cases, UE 115-c may benefit from using the reserved resource(s), PSSCH 205-b, for its PSSCH 205-c transmission in case the resources are not used by the original reserving UE 115-a (e.g., in case of sidelink Mode 2). For instance, in Mode 2, UEs 115 may determine sidelink resources for use (e.g., from a pool or resources) independent of scheduling from a base station 105. For example, UE 115-c may be configured (e.g., preconfigured) with sidelink resources by a base station 105 or the network so that UE 115-c is able to autonomously select a set of the configured resources for transmission.

UE 115-c may continuously monitor the PSFCH 210 for feedback related to all detected reservations (e.g., by one or more UEs 115-a or 115-b) to determine if the resources may be reclaimed by UE 115-c (e.g., if a PSFCH 210 indicates an ACK). The UE 115-c may, however, be limited in its ability to monitor a number of PSFCH 210 based on its capability and may miss some PSFCHs 210. Additionally or alternatively, the UE 115-b that transmits PSFCH 210 may be able to transmit a few PSFCH 210 simultaneously to meet a maximum power reduction (MPR) or additional MPR (AMPR) configuration. These limitations may create issues for UE 115-a to reclaim over the reserve PSSCH 205-b effectively, and additional considerations may be made by the UE 115-c.

For example, UE 115-c may segregate sidelink resources into different categories (e.g., at least two categories), for example available or occupied. The available resources for resource selection category may include resources that are free or available to UE 115-c, for instance, because no SCI indicating the resources as occupied or because the UE 115-c may measure an RSRP of the resources to be below a configured threshold. The occupied resources for resource selection category may include resources that are indicated by SCI as occupied by another UE 115-a, and a NACK is received, via PSFCH 210, by UE 115-a indicating the intent for retransmission on the reserved resources.

Special categorization rules may be defined for when UE 115-c may not detect NACK on PSFCH 210 for resources that are indicated as occupied by SCI (e.g., PSSCH 205-b). In some cases, UE 115-a may miss the detection of PSFCH 210 from UE 115-b for PSSCH 205-a, so UE 115-a may perform retransmission of the packets in PSSCH 205-a in PSSCH 205-b. Thus, the UE 115-c, which may attempt to reclaim the resources reserved for PSSCH 205-c, may reclaim the resources for which it detected the absence of NACK (in PSFCH 210) and the priority of the packet of the original reservation PSSCH 205-b is equal or lower than the priority of UE's 115-c own packet for transmission on PSSCH 205-c. These resources previously reserved by UE 115-a for PSSCH 205-5 may be considered in the available category for resource selection algorithm by UE 115-c.

If a priority of the reserved resources for which UE 115-c (which is planning to reclaim reserved resources of PSSCH 205-b) did not detect a NACK (in PSFCH 210) is higher than the priority of UE's 115-c own packet for transmission on PSSCH 205-c, then the resources for PSSCH 205-b remain for retransmission by UE 115-a and may be considered occupied for resource selection algorithm by UE 115-c.

Figure 3:
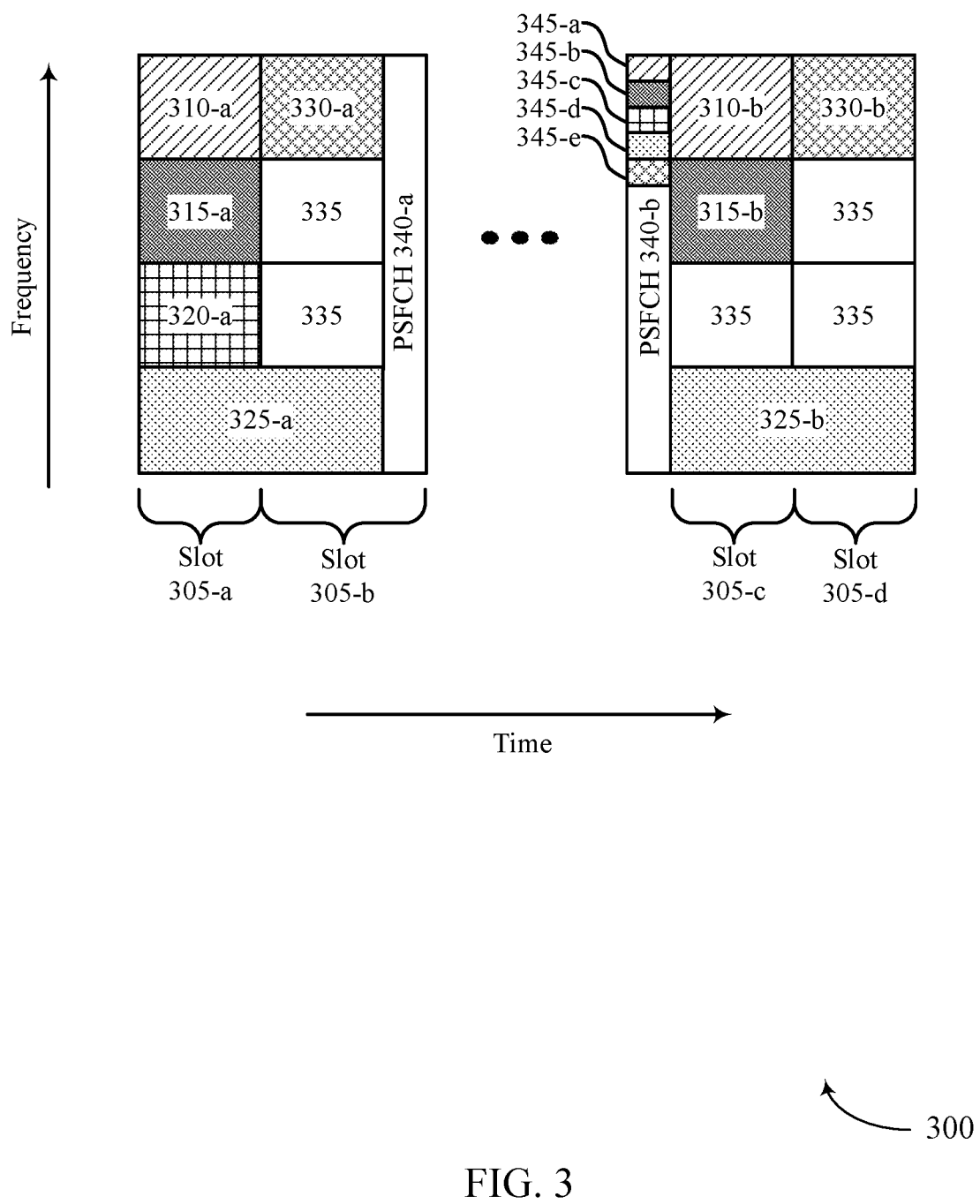
FIG. 3 illustrates an example of a sidelink resource configuration in accordance with aspects of the present disclosure.

FIG. 3 illustrates an example of a sidelink resource configuration 300 in accordance with aspects of the present disclosure. In some examples, sidelink resource configuration 300 may implement aspects of wireless communications system 100 and wireless communications system 200. Sidelink resource configuration 300 may be for a PSSCH and may include a number of slots 305, which each include sidelink resources in sub-channels 335.

As illustrated, sidelink resources in sub-channels 335 not scheduled by SCI may be solid (e.g., without shading or a pattern) and reserved resources may be shaded. System wide gaps in the resources of the PSSCH may allow feedback to be communicated on PSFCH 340. Further, corresponding shading may indicate information related to a common packet. For example, sub-channel 310-a may be used for an initial packet transmission, HARQ resource 345-a may be used for HARQ feedback from the receiver of the initial packet transmission, and sub-channel 310-b may be reserved for a retransmission of the packet based on the HARQ feedback. Similarly, sub-channels 315-a through 330-a may be used for different initial packet transmissions, HARQ resources 345-b through 345-e may be used for HARQ feedback from each of the receivers of the initial packet transmissions, respectively, and sub-channels 315-b through 330-b may be reserved for a retransmission of each packet, respectively, based on the corresponding HARQ feedback for each packet.

In some examples, retransmission resources may not be reserved, as shown by the initial packet transmission in sub-channel 320-a and available resources in the corresponding sub-channel 335 in slot 305-c. In some cases, HARQ resources 345 may be grouped by UE 115 numbering, such that feedback for odd numbered UEs 115 is grouped into the resources of two contiguous sub-channels, while the feedback for even number UEs 115 is grouped into the resources of another two contiguous sub-channels.

A UE 115 attempting to reclaim resources in slot 305-c and slot 305-d, may monitor PSFCH 340-b for feedback on HARQ resources 345. The UE 115 may have received SCI reserving sub-channels 310-b, 315-b, 325-b, and 330-b. If the UE 115 detects a NACK in HARQ resource 345-a, then UE 115 may determine that sub-channel 310-b may be used for retransmission of packets in sub-channel 310-a, and the UE 115 may not be reclaimed for its own use. In another case, if the UE 115 detects an ACK in HARQ resource 345-b, then UE 115 may determine that sub-channel 315-b may not be used for retransmission of packets in sub-channel 315-*a*, and the UE 115 may be reclaimed for its own PSSCH transmission.

In cases where no NACK feedback is detected in HARQ resources 345-*d* or 345-*e*, then the UE 115 may use additional parameters to determine whether sub-channels 325-*b* and 330-*b*, respectively, may be reclaimed for its own transmission and may categorize the sub-channels 325-*b* and 330-*b* accordingly. For example, if no NACK feedback is detected in HARQ resource 345-*d*, then the UE 115 determines that the priority of the packets in sub-channel 325-*a* are equal to or less than the priority of the packet for transmission by the UE 115, and the UE 115 may consider the sub-channel 325-*b* resources as "available" and the resources may be used for the transmission of the UE's 115 packet.

In another example, if no NACK feedback is detected in HARQ resource 345-*e*, then the UE 115 determines that the priority of the packets in sub-channel 330-*a* are higher than the priority of the UE's 115 own packet for transmission. Accordingly, the sub-channel 330-*b* may be considered "occupied" and the UE 115 may not reclaim those resources and may allocate other resources for transmitting its packet. The use of the packet priority may help to mitigate issues in the event the UE 115 missed the detection of feedback information in PSFCH 340-*b* for the packets from the other UE 115 (or if no feedback was transmitted).

Figure 4:
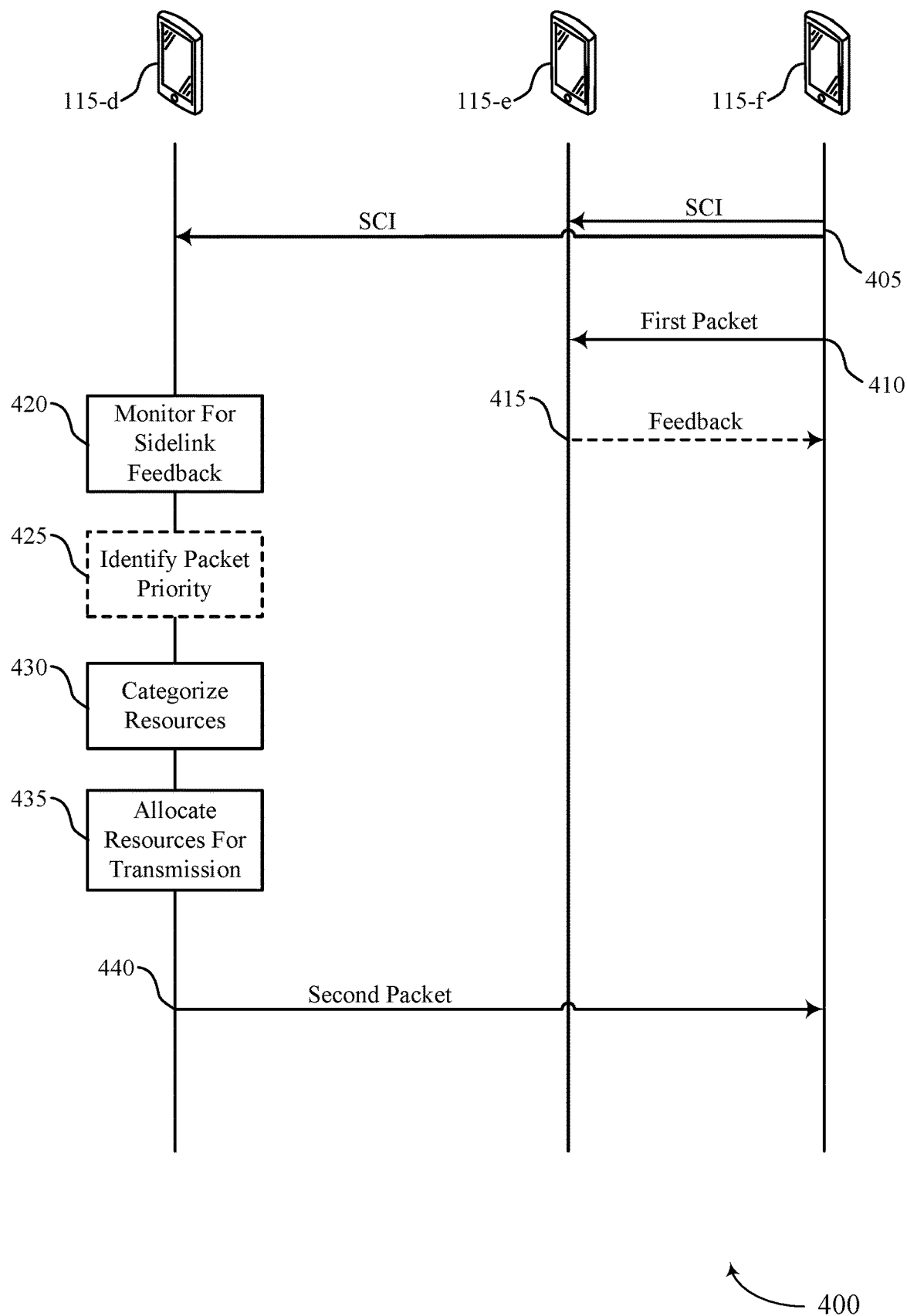
FIG. 4 illustrates an example of a process flow in a system in accordance with aspects of the present disclosure.

FIG. 4 illustrates an example of a process flow 400 in a system in accordance with aspects of the present disclosure. In some examples, process flow 400 may implement aspects of wireless communications system 100 and wireless communications system 200. Process flow 400 is shown as being implemented by UEs 115-*d*, 115-*e*, and 115-*f*, which may be a part of a V2X system and may be examples of the UEs as described with respect to FIGS. 1 and 2. For example, UE 115-*d* may be an example of UE 115-*c* of FIG. 2, UE 115-*e* may be an example of UE 115-*b* of FIG. 2, and UE 115-*f* may be an example of UE 115-*a* of FIG. 2.

In the following description of the process flow 400, the operations of UEs 115-*d*, 115-*e*, and 115-*f* may occur in a different order than the exemplary order shown. Some illustrated operations may also be left out of the process flow 400, or other operations may be added to the process flow 400. It is to be understood that while UEs 115-*d*, 115-*e*, and 115-*f* are shown performing a number of the operations of process flow 400, any wireless device may perform the operations shown.

At 405, UE 115-*f* may transmit, and UE 115-*e* may receive, SCI indicating one or more resources reserved for a retransmission of a first packet by UE 115-*f* (e.g., a retransmission after an original data transmission, such as at 410). In some examples, UE 115-*d* may also receive the SCI transmitted by UE 115-*f*.

At 410, UE 115-*f* may transmit, and UE 115-*e* may attempt to receive and decode, a first packet (e.g., a data transmission).

At 415, UE 115-*e* may optionally transmit, and UE 115-*f* may receive feedback such as ACK or NACK for the reception of the first packet at 410.

At 420, UE 115-*d* may monitor one or more channels (e.g., a PSFCH) for sidelink feedback information, transmitted to UE 115-*f* from UE 115-*e*, that is responsive to an initial transmission of the first packet at 410. In some cases, the monitoring may include UE 115-*d* determining an absence of the sidelink feedback information, such as the absence of a NACK, based on the monitoring, where categorizing the resources at 430 may be based on the absence of the sidelink feedback information. Alternatively, UE 115-*d* may detect sidelink feedback information (e.g., ACK or NACK) during the monitoring, where categorizing the resources at 430 may be based on the detected sidelink feedback information. In some cases, at 420, UE 115-*d* may monitor RSRP and detect that an RSRP associated with the one or more resources is below a configured threshold.

At 425, UE 115-*d* may optionally identify packet priority of the first packet and a second packet to be transmitted by UE 115-*d* at 435.

At 430, UE 115-*d* may categorize resources into a number of categories, which may include an available category or an occupied category, or both. For example, UE 115-*d* may identify a category of the one or more retransmission resources based on whether the sidelink feedback information is detected during the monitoring at 420. Identifying the category of the one or more resources may be based on a comparison of the first priority and the second priority determined at 425. For instance, if UE 115-*d* identifies that the first priority is equal to or less than the second priority based at least in part on the comparison, then the one or more resources may be classified as available. Otherwise, if UE 115-*d* identifies that the first priority is greater than the second priority based at least in part on the comparison, then the one or more resources may be classified as occupied.

At 435, UE 115-*d* may allocate a set of resources for transmission of a second packet at 440, where the one or more retransmission resources may be included in the set of resources based on the identified category of the one or more resources.

At 440, UE 115-*d* may transmit, and UE 115-*f* may receive a second packet. UE 115-*d* may transmit the second packet to additional or alternative UEs 115 not shown. In some cases, UE 115-*d* may transmit the second packet using the one or more resources based on the first priority being equal to or less than the second priority and allocating the set of resources to include the one or more resources. In other cases, UE 115-*d* may transmit the second packet excluding the one or more resources based on the first priority being higher than the second priority. In some examples, UE 115-*d* may transmit the second packet using the set of resources, where the set of resources may be allocated to exclude the one or more resources based on detecting sidelink feedback information, such as a NACK, at 420. In other examples, UE 115-*d* may transmit the second packet using the set of resources, where the set of resources may be allocated to include the one or more resources based on detecting sidelink feedback information, such as an ACK, at 420. In some examples, UE 115-*d* may transmit the second packet using the one or more resources based on the detected reference signal received power at 420 and allocating the set of resources to include the one or more resources at 435.

Figure 5:
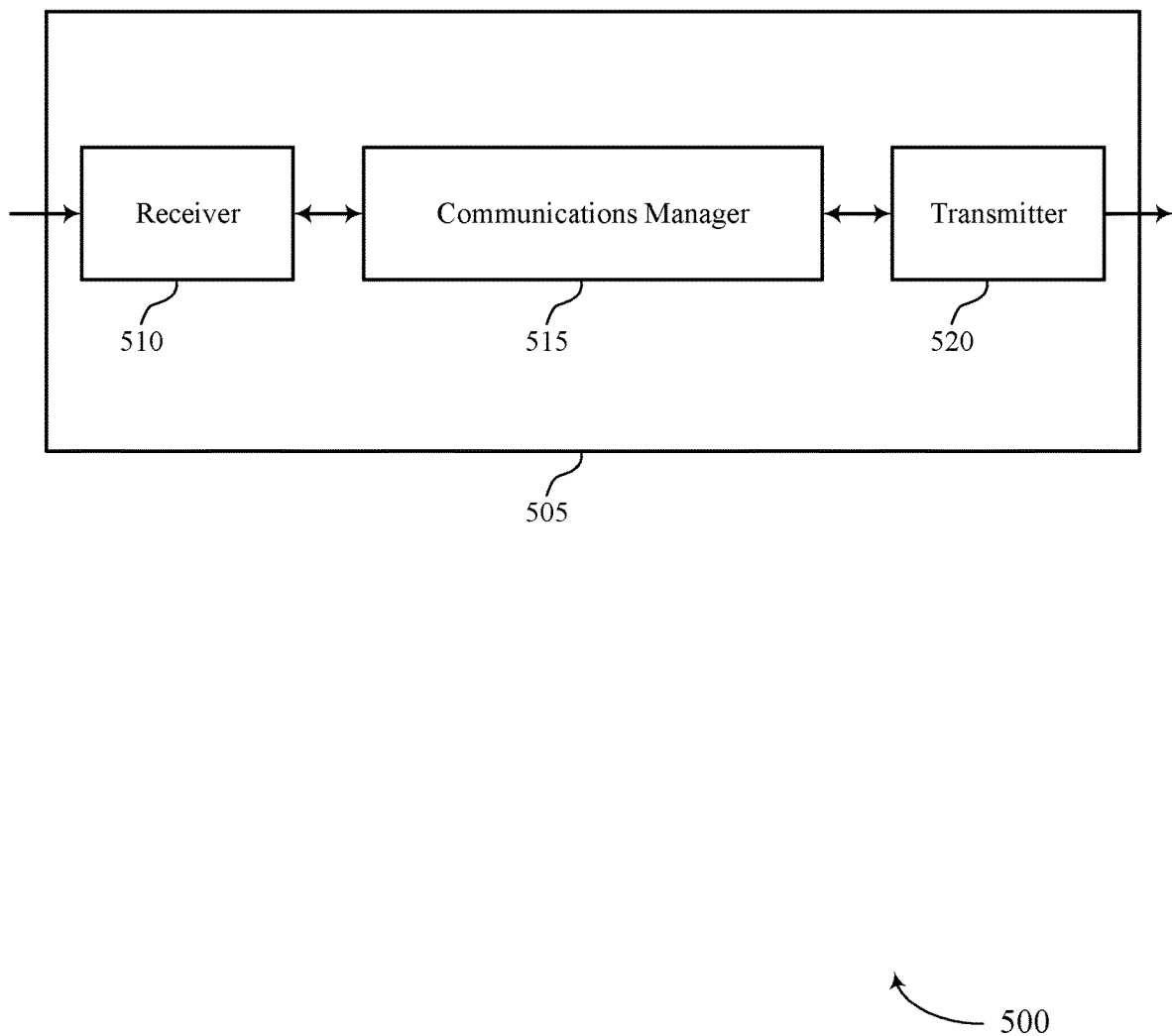
FIGS. 5 and 6 show block diagrams of devices in accordance with aspects of the present disclosure.

FIG. 5 shows a block diagram 500 of a device 505 in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to reclaiming resources based on sidelink feedback, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, by the first UE, SCI indicating one or more resources reserved for retransmission of a first packet by a second UE. The communications manager 515 may monitor for sidelink feedback information that is responsive to an initial transmission of the first packet by the second UE. The communications manager 515 may identify a category of the one or more resources based on whether the sidelink feedback information is detected during the monitoring. The communications manager 515 may allocate, by the first UE, a set of resources for transmission of a second packet, where the one or more resources are included in the set of resources based on the identified category of the one or more resources. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

In some examples, the communications manager 515 may be implemented as an integrated circuit or chipset for a mobile device modem, and the receiver 510 and transmitter 520 may be implemented as analog components (e.g., amplifiers, filters, antennas) coupled with the mobile device modem to enable wireless transmission and reception over one or more bands.

The communications manager 515 as described herein may be implemented to realize one or more potential advantages. One implementation may allow the device 505 to determine if a set of resources, allocated to another device, may be reclaimed for communication between the device 505 and a base station. Based on the techniques for determining if a set of resources may be reclaimed, the device 505 may communicate with the base station using the reclaimed resources.

As such, the device 505 may communicate using resources that may have not been utilized otherwise and, accordingly, the device may improve the spectral efficiency of the wireless communications system. Additionally, device 505 may communicate using resources that may not have otherwise been available to device 505 for communication. In some examples, based on reclaiming resources allocated to other devices, device 505 may communicate with a lower latency and with greater speeds, which may provide a better user experience, save power, and increase battery life.

Figure 6:
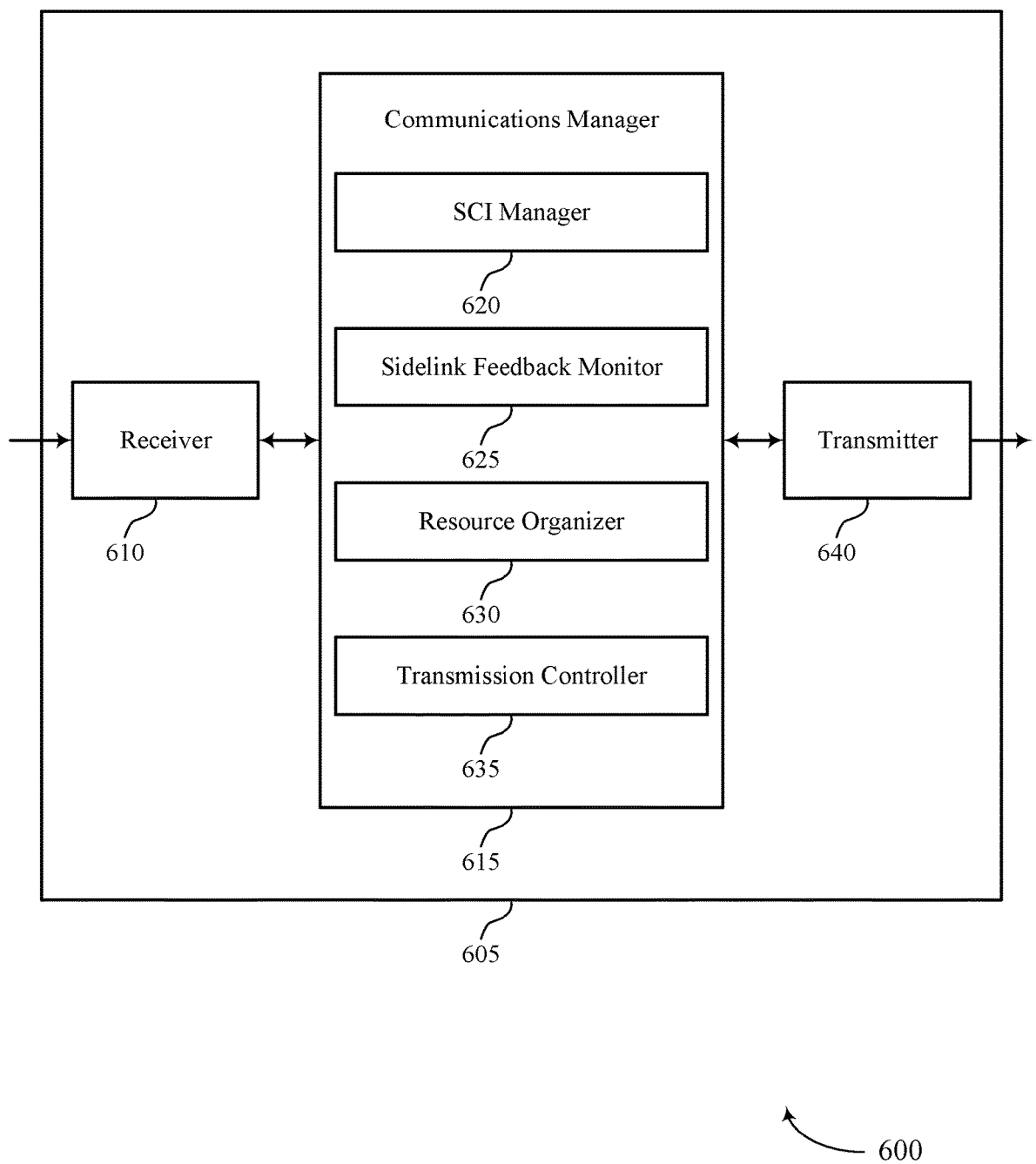

FIG. 6 shows a block diagram 600 of a device 605 in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to reclaiming resources based on sidelink feedback, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include an SCI manager 620, a sidelink feedback monitor 625, a resource organizer 630, and a transmission controller 635. The communications manager 615 may be an example of aspects of the communications manager 810 described herein.

The SCI manager 620 may receive, by the first UE, SCI indicating one or more resources reserved for retransmission of a first packet by a second UE.

The sidelink feedback monitor 625 may monitor for sidelink feedback information that is responsive to an initial transmission of the first packet by the second UE.

The resource organizer 630 may identify a category of the one or more resources based on whether the sidelink feedback information is detected during the monitoring.

The transmission controller 635 may allocate, by the first UE, a set of resources for transmission of a second packet, where the one or more resources are included in the set of resources based on the identified category of the one or more resources.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
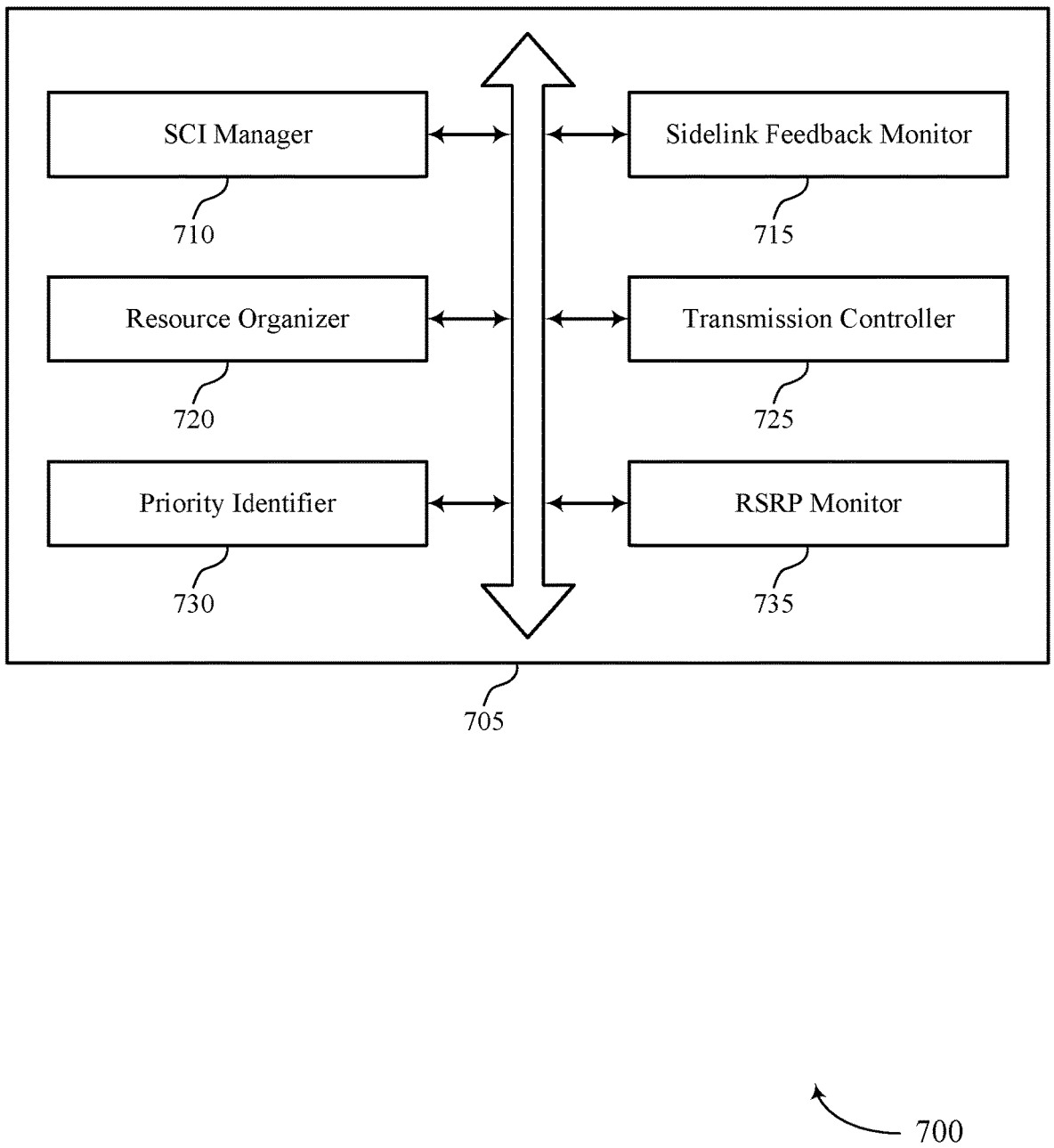
FIG. 7 shows a block diagram of a communications manager in accordance with aspects of the present disclosure.

FIG. 7 shows a block diagram 700 of a communications manager 705 in accordance with aspects of the present disclosure. The communications manager 705 may be an example of aspects of a communications manager 515, a communications manager 615, or a communications manager 810 described herein. The communications manager 705 may include an SCI manager 710, a sidelink feedback monitor 715, a resource organizer 720, a transmission controller 725, a priority identifier 730, and an RSRP monitor 735. Each of these modules may communicate, directly or indirectly, with one another (e.g., via one or more buses).

The SCI manager 710 may receive, by the first UE, SCI indicating one or more resources reserved for retransmission of a first packet by a second UE. In some cases, the first UE and the second UE operate in a vehicle-to-everything system.

The sidelink feedback monitor 715 may monitor for sidelink feedback information that is responsive to an initial transmission of the first packet by the second UE. In some examples, the sidelink feedback monitor 715 may determine an absence of the sidelink feedback information based on the monitoring, where identifying the category is based on the absence of the sidelink feedback information. In some examples, the sidelink feedback monitor 715 may detect the sidelink feedback information based on the monitoring, where identifying the category is based on the detected sidelink feedback information. In some examples, the sidelink feedback monitor 715 may monitor a physical sidelink feedback channel for the sidelink feedback information transmitted to the second UE. In some cases, the sidelink feedback information includes a negative acknowledgment. In some cases, the sidelink feedback information includes a positive acknowledgment.

The resource organizer 720 may identify a category of the one or more resources based on whether the sidelink feedback information is detected during the monitoring. In some cases, the category of the one or more resources includes an available category or an occupied category.

The transmission controller 725 may allocate, by the first UE, a set of resources for transmission of a second packet, where the one or more resources are included in the set of resources based on the identified category of the one or more resources. In some examples, the transmission controller 725 may transmit the second packet using the one or more resources based on the first priority being equal to the second priority and allocating the set of resources to include the one or more resources. In some examples, the transmission controller 725 may transmit the second packet using the one or more resources based on the first priority being less than the second priority and allocating the set of resources to include the one or more resources.

In some examples, the transmission controller 725 may transmit the second packet using the set of resources, where the set of resources is allocated to exclude the one or more resources based on the first priority being higher than the second priority. In some examples, the transmission controller 725 may transmit the second packet using the set of resources, where the set of resources is allocated to exclude the one or more resources based on the detected sidelink feedback information. In some examples, the transmission controller 725 may transmit the second packet using the one or more resources based on the detected sidelink feedback information and allocating the set of resources to include the one or more resources. In some examples, the transmission controller 725 may transmit the second packet using the one or more resources based on the detected reference signal received power and allocating the set of resources to include the one or more resources.

The priority identifier 730 may identify a first priority of the first packet. In some examples, the priority identifier 730 may identify a second priority of the second packet, where identifying the category of the one or more resources is based on a comparison of the first priority and the second priority. In some examples, the priority identifier 730 may identify that the first priority is equal to the second priority based on the comparison. In some examples, the priority identifier 730 may identify that the first priority is less than the second priority based on the comparison. In some examples, the priority identifier 730 may determine that the first priority is higher than the second priority.

The RSRP monitor 735 may detect that a reference signal received power associated with the one or more resources is below a configured threshold.

Figure 8:
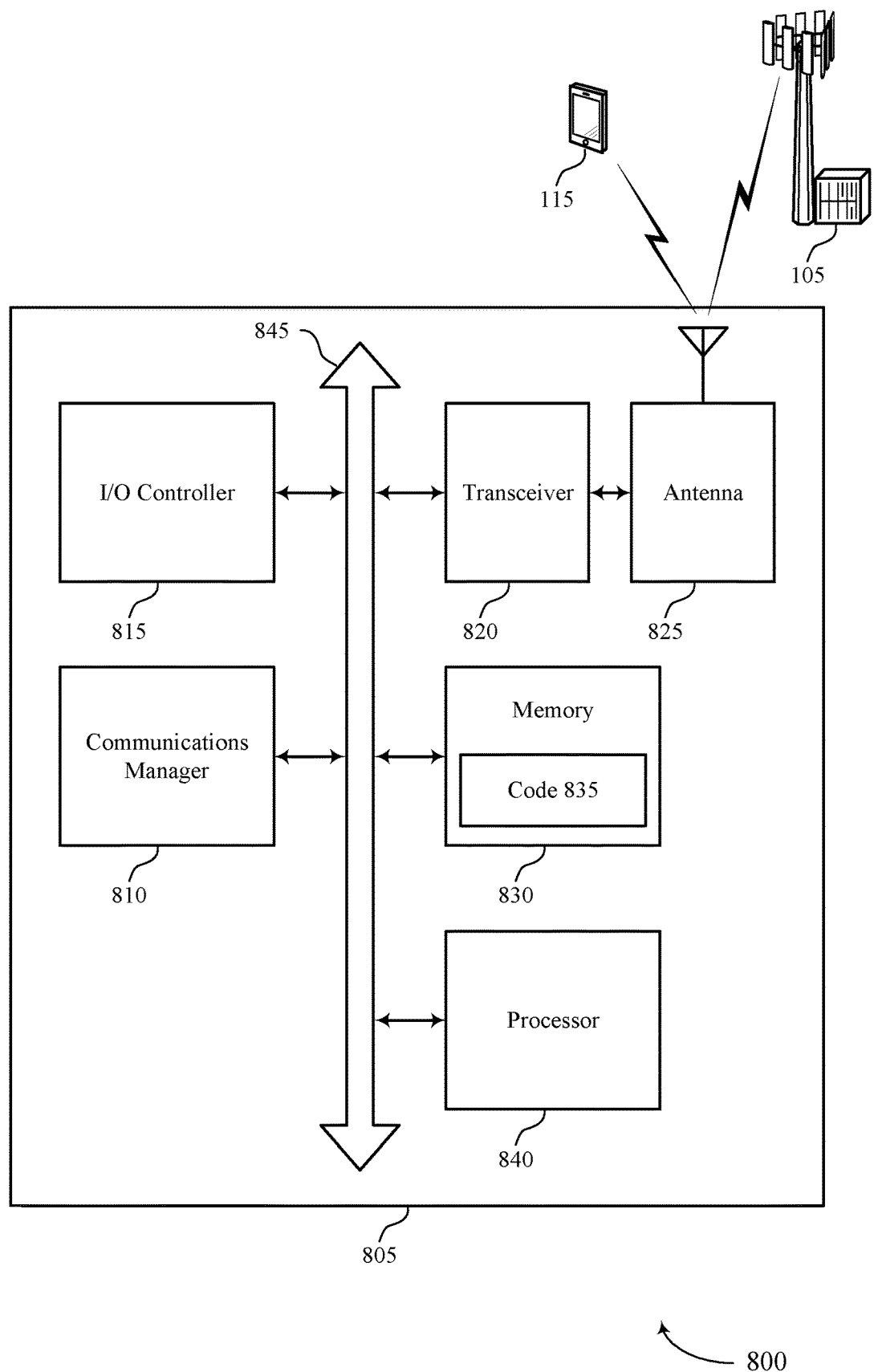
FIG. 8 shows a diagram of a system including a device in accordance with aspects of the present disclosure.

FIG. 8 shows a diagram of a system 800 including a device 805 in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, by the first UE, SCI indicating one or more resources reserved for retransmission of a first packet by a second UE, monitor for sidelink feedback information that is responsive to an initial transmission of the first packet by the second UE, identify a category of the one or more resources based on whether the sidelink feedback information is detected during the monitoring, and allocate, by the first UE, a set of resources for transmission of a second packet, where the one or more resources are included in the set of resources based on the identified category of the one or more resources.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting reclaiming resources based on sidelink feedback).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
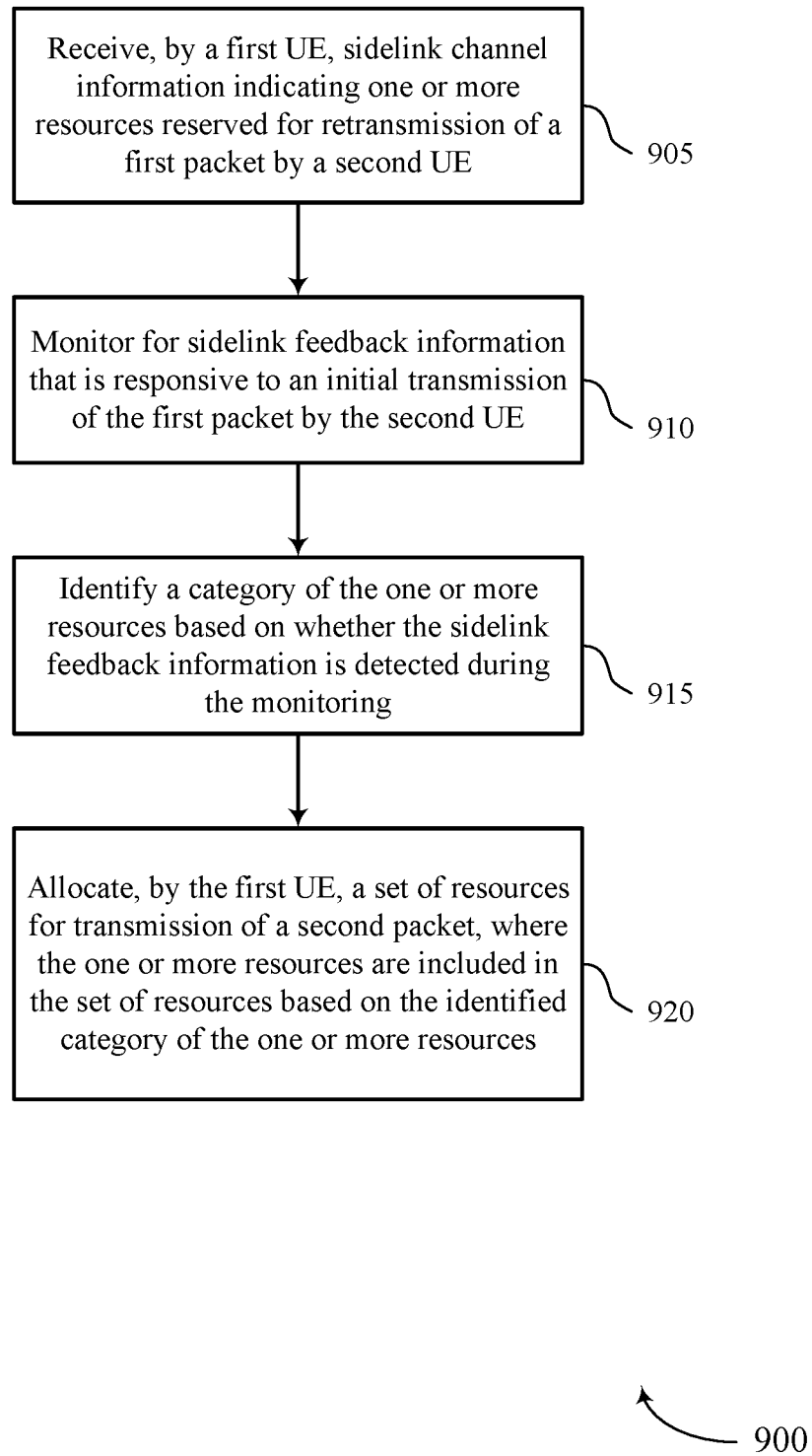
FIGS. 9 through 13 show flowcharts illustrating methods in accordance with aspects of the present disclosure.

FIG. 9 shows a flowchart illustrating a method 900 in accordance with aspects of the present disclosure. The operations of method 900 may be implemented by a UE 115 (e.g., a first UE) or its components as described herein. For example, the operations of method 900 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 905, the first UE may receive SCI indicating one or more resources reserved for retransmission of a first packet by a second UE. The operations of 905 may be performed according to the methods described herein. In some examples, aspects of the operations of 905 may be performed by an SCI manager as described with reference to FIGS. 5 through 8.

At 910, the first UE may monitor for sidelink feedback information that is responsive to an initial transmission of the first packet by the second UE. The operations of 910 may be performed according to the methods described herein. In some examples, aspects of the operations of 910 may be performed by a sidelink feedback monitor as described with reference to FIGS. 5 through 8.

At 915, the first UE may identify a category of the one or more resources based on whether the sidelink feedback information is detected during the monitoring. The operations of 915 may be performed according to the methods described herein. In some examples, aspects of the operations of 915 may be performed by a resource organizer as described with reference to FIGS. 5 through 8.

At 920, the first UE may allocate a set of resources for transmission of a second packet, where the one or more resources are included in the set of resources based on the identified category of the one or more resources. The operations of 920 may be performed according to the methods described herein. In some examples, aspects of the operations of 920 may be performed by a transmission controller as described with reference to FIGS. 5 through 8.

Figure 10:
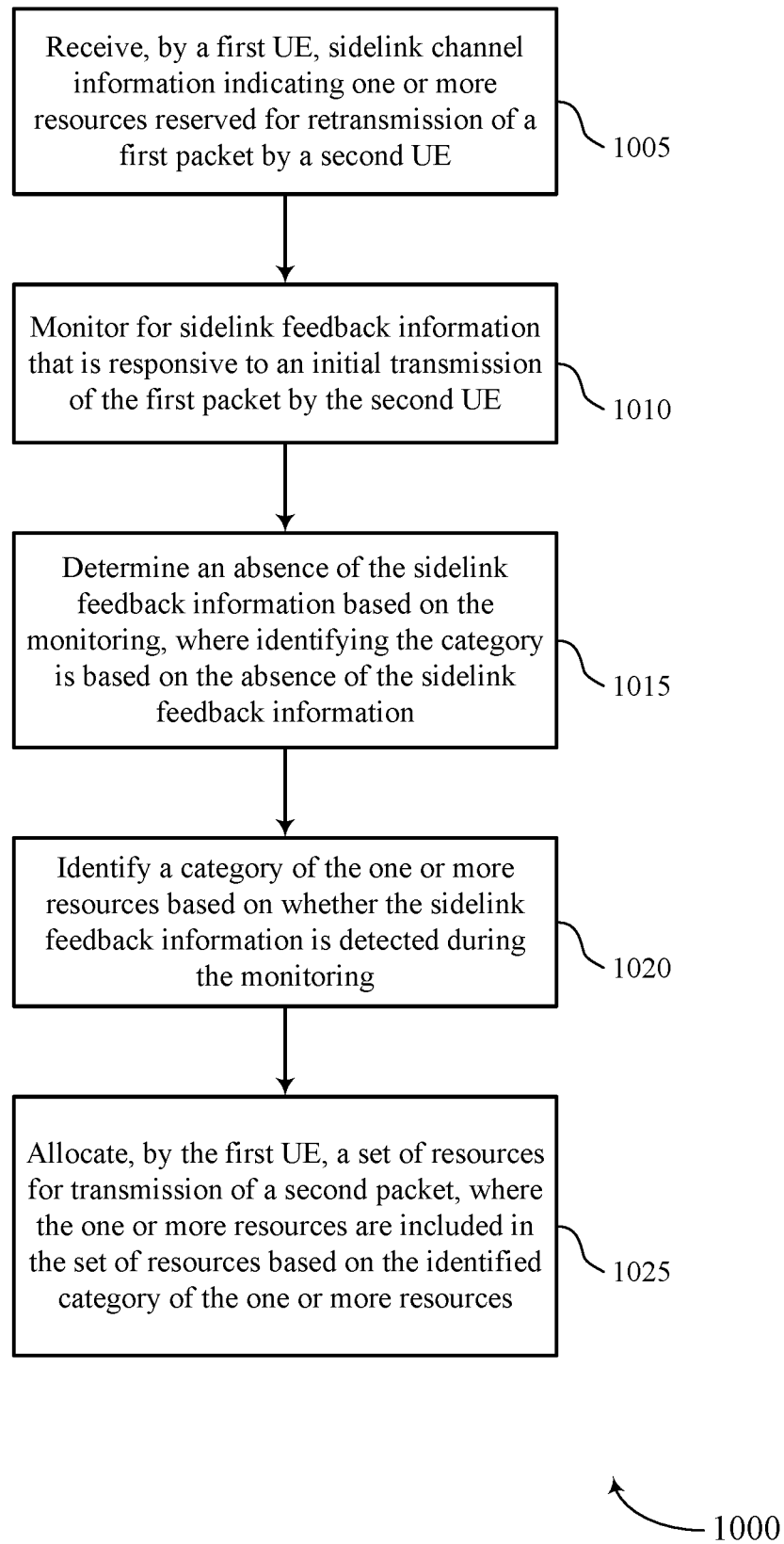

FIG. 10 shows a flowchart illustrating a method 1000 in accordance with aspects of the present disclosure. The operations of method 1000 may be implemented by a UE 115 (e.g., a first UE) or its components as described herein. For example, the operations of method 1000 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1005, the first UE may receive SCI indicating one or more resources reserved for retransmission of a first packet by a second UE. The operations of 1005 may be performed according to the methods described herein. In some examples, aspects of the operations of 1005 may be performed by an SCI manager as described with reference to FIGS. 5 through 8.

At 1010, the first UE may monitor for sidelink feedback information that is responsive to an initial transmission of the first packet by the second UE. The operations of 1010 may be performed according to the methods described herein. In some examples, aspects of the operations of 1010 may be performed by a sidelink feedback monitor as described with reference to FIGS. 5 through 8.

At 1015, the first UE may determine an absence of the sidelink feedback information based on the monitoring, where identifying the category is based on the absence of the sidelink feedback information. The operations of 1015 may be performed according to the methods described herein. In some examples, aspects of the operations of 1015 may be performed by a sidelink feedback monitor as described with reference to FIGS. 5 through 8.

At 1020, the first UE may identify a category of the one or more resources based on whether the sidelink feedback information is detected during the monitoring. The operations of 1020 may be performed according to the methods described herein. In some examples, aspects of the operations of 1020 may be performed by a resource organizer as described with reference to FIGS. 5 through 8.

At 1025, the first UE may allocate a set of resources for transmission of a second packet, where the one or more resources are included in the set of resources based on the identified category of the one or more resources. The operations of 1025 may be performed according to the methods described herein. In some examples, aspects of the operations of 1025 may be performed by a transmission controller as described with reference to FIGS. 5 through 8.

Figure 11:
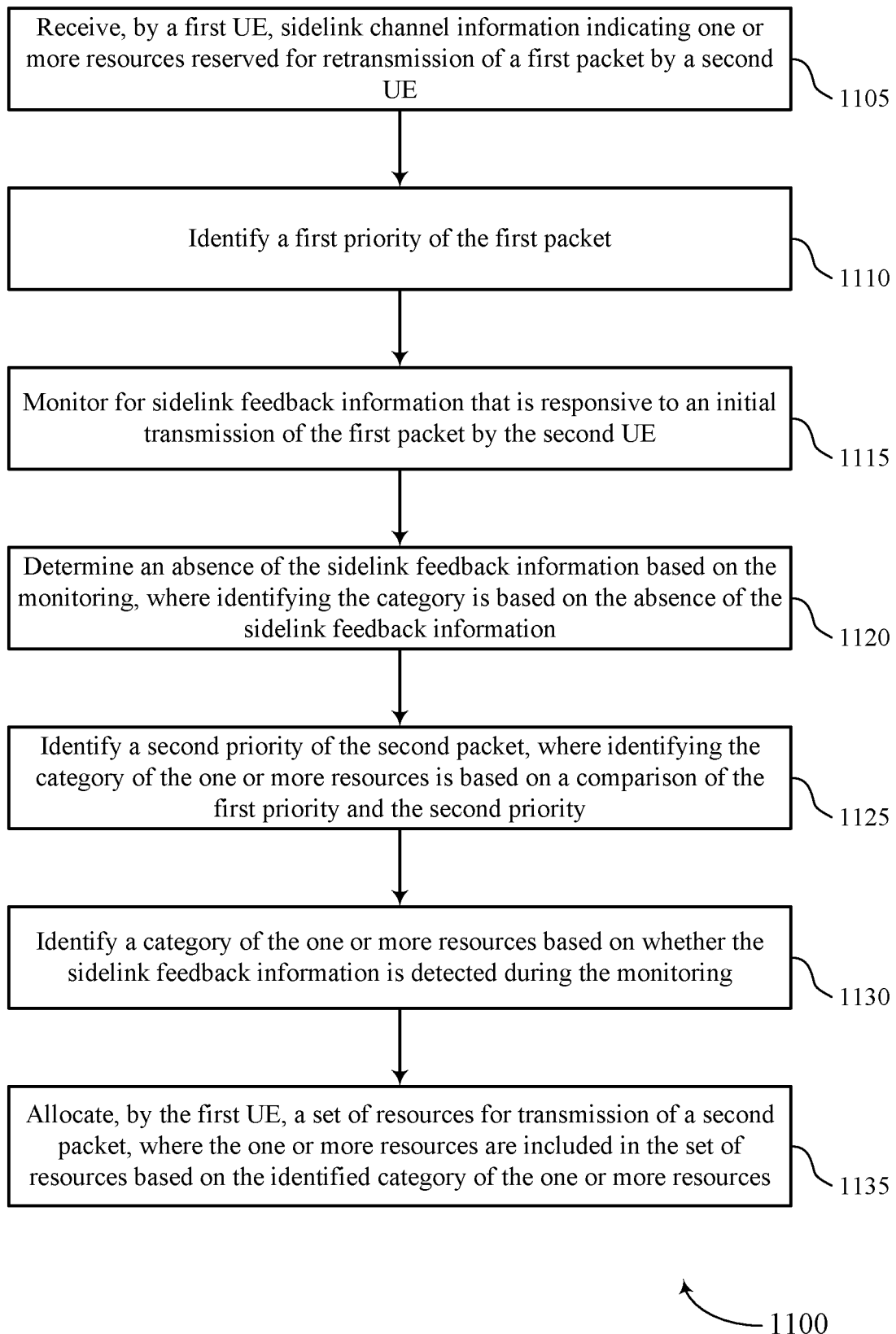

FIG. 11 shows a flowchart illustrating a method 1100 in accordance with aspects of the present disclosure. The operations of method 1100 may be implemented by a UE 115 (e.g., a first UE) or its components as described herein. For example, the operations of method 1100 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1105, the first UE may receive SCI indicating one or more resources reserved for retransmission of a first packet by a second UE. The operations of 1105 may be performed according to the methods described herein. In some examples, aspects of the operations of 1105 may be performed by an SCI manager as described with reference to FIGS. 5 through 8.

At 1110, the first UE may identify a first priority of the first packet. The operations of 1110 may be performed according to the methods described herein. In some examples, aspects of the operations of 1110 may be performed by a priority identifier as described with reference to FIGS. 5 through 8.

At 1115, the first UE may monitor for sidelink feedback information that is responsive to an initial transmission of the first packet by the second UE. The operations of 1115 may be performed according to the methods described herein. In some examples, aspects of the operations of 1115 may be performed by a sidelink feedback monitor as described with reference to FIGS. 5 through 8.

At 1120, the first UE may determine an absence of the sidelink feedback information based on the monitoring, where identifying the category is based on the absence of the sidelink feedback information. The operations of 1120 may be performed according to the methods described herein. In some examples, aspects of the operations of 1120 may be performed by a sidelink feedback monitor as described with reference to FIGS. 5 through 8.

At 1125, the first UE may identify a second priority of the second packet, where identifying the category of the one or more resources is based on a comparison of the first priority and the second priority. The operations of 1125 may be performed according to the methods described herein. In some examples, aspects of the operations of 1125 may be performed by a priority identifier as described with reference to FIGS. 5 through 8.

At 1130, the first UE may identify a category of the one or more resources based on whether the sidelink feedback information is detected during the monitoring. The operations of 1130 may be performed according to the methods described herein. In some examples, aspects of the operations of 1130 may be performed by a resource organizer as described with reference to FIGS. 5 through 8.

At 1135, the first UE may allocate a set of resources for transmission of a second packet, where the one or more resources are included in the set of resources based on the identified category of the one or more resources. The operations of 1135 may be performed according to the methods described herein. In some examples, aspects of the operations of 1135 may be performed by a transmission controller as described with reference to FIGS. 5 through 8.

Figure 12:
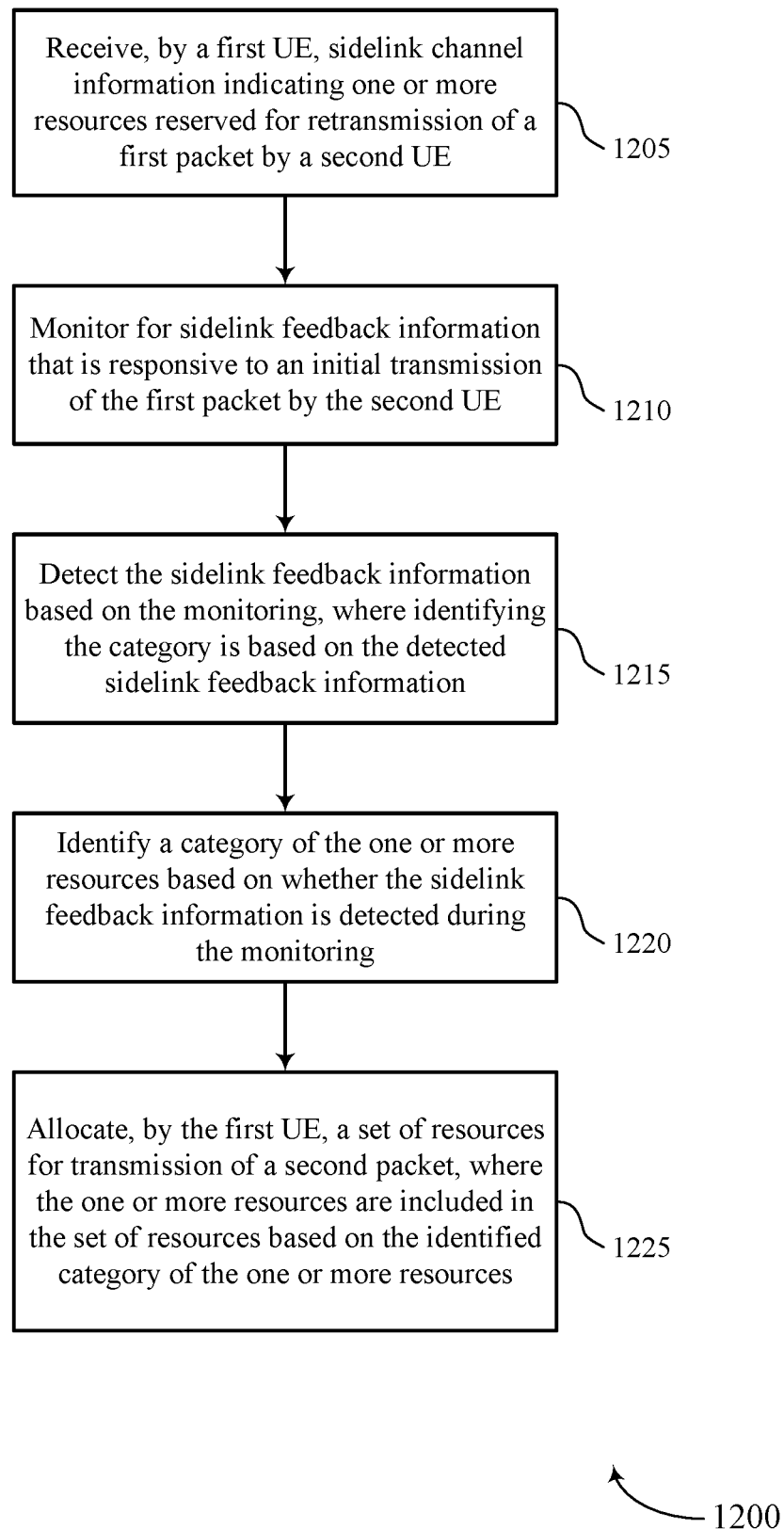

FIG. 12 shows a flowchart illustrating a method 1200 in accordance with aspects of the present disclosure. The operations of method 1200 may be implemented by a UE 115 (e.g., a first UE) or its components as described herein. For example, the operations of method 1200 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1205, the first UE may receive SCI indicating one or more resources reserved for retransmission of a first packet by a second UE. The operations of 1205 may be performed according to the methods described herein. In some examples, aspects of the operations of 1205 may be performed by an SCI manager as described with reference to FIGS. 5 through 8.

At 1210, the first UE may monitor for sidelink feedback information that is responsive to an initial transmission of the first packet by the second UE. The operations of 1210 may be performed according to the methods described herein. In some examples, aspects of the operations of 1210 may be performed by a sidelink feedback monitor as described with reference to FIGS. 5 through 8.

At 1215, the first UE may detect the sidelink feedback information based on the monitoring, where identifying the category is based on the detected sidelink feedback information. The operations of 1215 may be performed according to the methods described herein. In some examples, aspects of the operations of 1215 may be performed by a sidelink feedback monitor as described with reference to FIGS. 5 through 8.

At 1220, the first UE may identify a category of the one or more resources based on whether the sidelink feedback information is detected during the monitoring. The operations of 1220 may be performed according to the methods described herein. In some examples, aspects of the operations of 1220 may be performed by a resource organizer as described with reference to FIGS. 5 through 8.

At 1225, the first UE may allocate a set of resources for transmission of a second packet, where the one or more resources are included in the set of resources based on the identified category of the one or more resources. The operations of 1225 may be performed according to the methods described herein. In some examples, aspects of the operations of 1225 may be performed by a transmission controller as described with reference to FIGS. 5 through 8.

Figure 13:
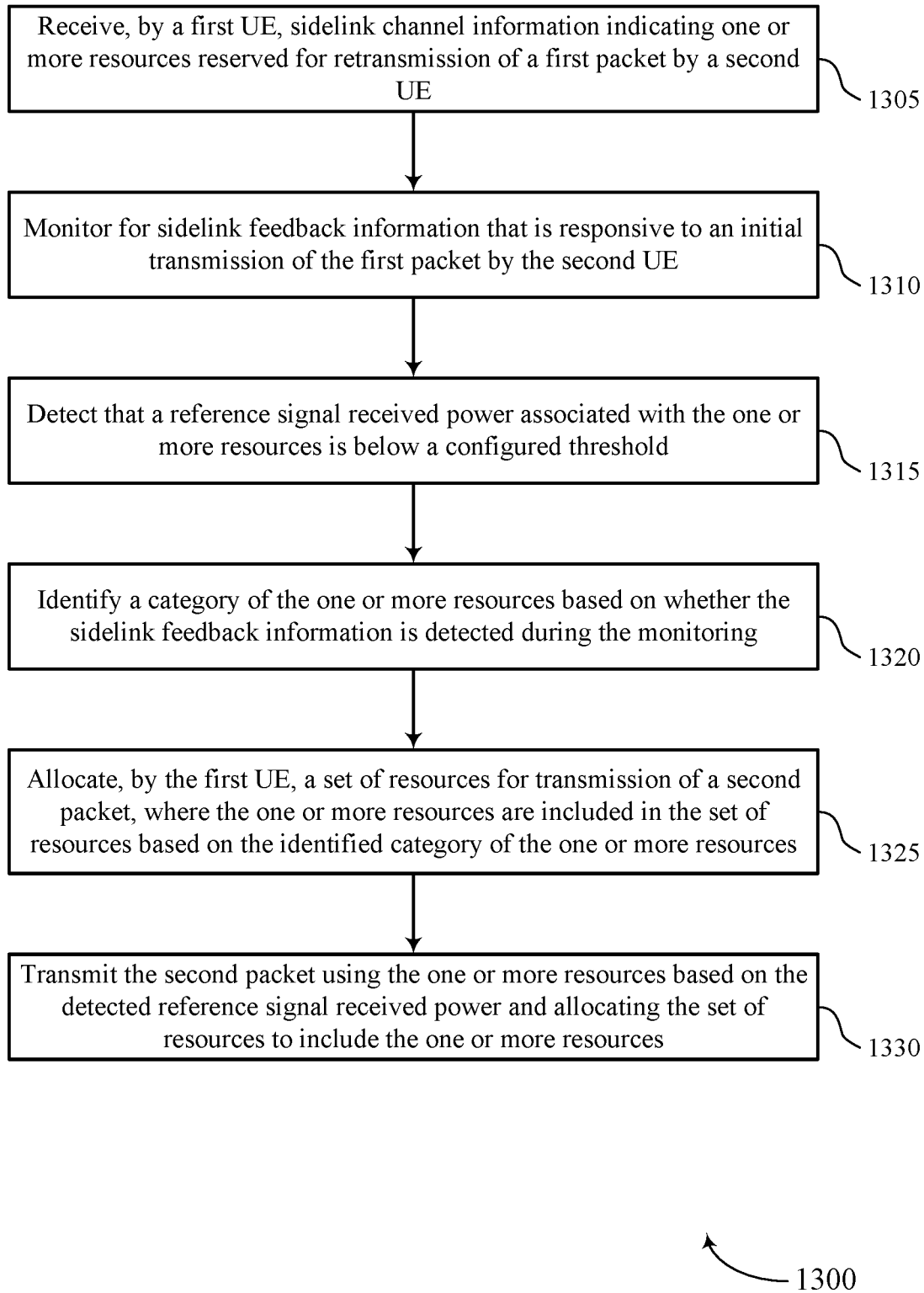

FIG. 13 shows a flowchart illustrating a method 1300 in accordance with aspects of the present disclosure. The operations of method 1300 may be implemented by a UE 115 (e.g., a first UE) or its components as described herein. For example, the operations of method 1300 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1305, the first UE may receive SCI indicating one or more resources reserved for retransmission of a first packet by a second UE. The operations of 1305 may be performed according to the methods described herein. In some examples, aspects of the operations of 1305 may be performed by an SCI manager as described with reference to FIGS. 5 through 8.

At 1310, the first UE may monitor for sidelink feedback information that is responsive to an initial transmission of the first packet by the second UE. The operations of 1310 may be performed according to the methods described herein. In some examples, aspects of the operations of 1310 may be performed by a sidelink feedback monitor as described with reference to FIGS. 5 through 8.

At 1315, the first UE may detect that a reference signal received power associated with the one or more resources is below a configured threshold. The operations of 1315 may be performed according to the methods described herein. In some examples, aspects of the operations of 1315 may be performed by an RSRP monitor as described with reference to FIGS. 5 through 8.

At 1320, the first UE may identify a category of the one or more resources based on whether the sidelink feedback information is detected during the monitoring. The operations of 1320 may be performed according to the methods described herein. In some examples, aspects of the operations of 1320 may be performed by a resource organizer as described with reference to FIGS. 5 through 8.

At 1325, the first UE may allocate a set of resources for transmission of a second packet, where the one or more resources are included in the set of resources based on the identified category of the one or more resources. The operations of 1325 may be performed according to the methods described herein. In some examples, aspects of the operations of 1325 may be performed by a transmission controller as described with reference to FIGS. 5 through 8.

At 1330, the first UE may transmit the second packet using the one or more resources based on the detected reference signal received power and allocating the set of resources to include the one or more resources. The operations of 1330 may be performed according to the methods described herein. In some examples, aspects of the operations of 1330 may be performed by a transmission controller as described with reference to FIGS. 5 through 8.

Example 1

A method for wireless communications at a first UE comprising: receiving, by the first UE, SCI indicating one or more resources reserved for retransmission of a first packet by a second UE; monitoring for sidelink feedback information that is responsive to an initial transmission of the first packet by the second UE; identifying a category of the one or more resources based at least in part on whether the sidelink feedback information is detected during the monitoring; and allocating, by the first UE, a set of resources for transmission of a second packet, wherein the one or more resources are included in the set of resources based at least in part on the identified category of the one or more resources.

Example 2

The method of example 1 further comprising: determining an absence of sidelink feedback information based at least in part on the monitoring, wherein identifying the category is based at least in part on the absence of the sidelink feedback information.

Example 3

The method of example 2 further comprising: identifying a first priority of the first packet; and identifying a second priority of the second packet, wherein identifying the category of the one or more resources is based at least in part on a comparison of the first priority and the second priority.

Example 4

The method of examples 1 through 3 further comprising: identifying that the first priority is equal to the second priority based at least in part on the comparison; and transmitting the second packet using the one or more resources based at least in part on the first priority being equal to the second priority and allocating the set of resources to include the one or more resources.

Example 5

The method of examples 1 through 3 further comprising: identifying that the first priority is less than the second priority based at least in part on the comparison; and transmitting the second packet using the one or more resources based at least in part on the first priority being less than the second priority and allocating the set of resources to include the one or more resources.

Example 6

The method of examples 1 through 3 further comprising: determining that the first priority is higher than the second priority; and transmitting the second packet using the set of resources, wherein the set of resources is allocated to exclude the one or more resources based at least in part on the first priority being higher than the second priority.

Example 7

The method of examples 2 through 6 wherein the sidelink feedback information comprises a negative acknowledgement.

Example 8

The method of examples 1 through 7 further comprising: detecting the sidelink feedback information based at least in part on the monitoring, wherein identifying the category is based at least in part on the detected sidelink feedback information.

Example 9

The method of example 8 further comprising: transmitting the second packet using the set of resources, wherein the set of resources is allocated to exclude the one or more resources based at least in part on the detected sidelink feedback information.

Example 10

The method of example 9 wherein the sidelink feedback information comprises a negative acknowledgement.

Example 11

The method of examples 8 through 10 further comprising: transmitting the second packet using the one or more resources based at least in part on the detected sidelink feedback information and allocating the set of resources to include the one or more resources.

Example 12

The method of example 11 wherein the sidelink feedback information comprises a positive acknowledgement.

Example 13

The method of examples 1 through 12 further comprising: detecting that an RSRP associated with the one or more resources is below a configured threshold; and transmitting the second packet using the one or more resources based at least in part on the detected RSRP and allocating the set of resources to include the one or more resources.

Example 14

The method of examples 1 through 13 wherein monitoring for the sidelink feedback information comprises: monitoring a physical sidelink feedback channel for the sidelink feedback information transmitted to the second UE.

Example 15

The method of examples 1 through 14 wherein the category of the one or more resources comprises an available category or an occupied category.

Example 16

The method of examples 1 through 15 wherein the first UE and the second UE operate in a vehicle-to-everything system.

Example 17

An apparatus for wireless communication comprising at least one means for performing a method of any one of examples 1 through 16.

Example 18

An apparatus for wireless communication comprising a process and memory coupled to the processor, the process and memory configured to cause the apparatus to perform a method of any one of examples 1 through 16.

Example 19

A non-transitory computer-readable medium storing code for wireless communication comprising a processor, memory in electronic communication with the processor, and instructions stored in the memory and executable by the processor to cause the apparatus to perform a method of any one of examples 1 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first user equipment (UE), comprising:
   receiving, by the first UE, sidelink channel information indicating one or more resources reserved for retransmission of a first packet by a second UE;
   monitoring for sidelink feedback information that is responsive to an initial transmission of the first packet by the second UE;
   identifying a category of a plurality of categories for the one or more resources based at least in part on whether the sidelink feedback information is detected during the monitoring; and
   allocating, by the first UE, a set of resources for transmission of a second packet, wherein the one or more resources are included in the set of resources based at least in part on the identified category of the plurality of categories for the one or more resources.

2. The method of claim 1, further comprising:
   determining an absence of the sidelink feedback information based at least in part on the monitoring, wherein identifying the category is based at least in part on the absence of the sidelink feedback information.

3. The method of claim 2, further comprising:
   identifying a first priority of the first packet; and
   identifying a second priority of the second packet, wherein identifying the category of the one or more resources is based at least in part on a comparison of the first priority and the second priority.

4. The method of claim 3, further comprising:
   identifying that the first priority is equal to the second priority based at least in part on the comparison; and
   transmitting the second packet using the one or more resources based at least in part on the first priority being equal to the second priority and allocating the set of resources to include the one or more resources.

5. The method of claim 3, further comprising:
   identifying that the first priority is less than the second priority based at least in part on the comparison; and
   transmitting the second packet using the one or more resources based at least in part on the first priority being less than the second priority and allocating the set of resources to include the one or more resources.

6. The method of claim 3, further comprising:
   determining that the first priority is higher than the second priority; and
   transmitting the second packet using the set of resources, wherein the set of resources is allocated to exclude the one or more resources based at least in part on the first priority being higher than the second priority.

7. The method of claim 2, wherein the sidelink feedback information comprises a negative acknowledgment.

8. The method of claim 1, further comprising:
   detecting the sidelink feedback information based at least in part on the monitoring, wherein identifying the category is based at least in part on the detected sidelink feedback information.

9. The method of claim 8, further comprising:
   transmitting the second packet using the set of resources, wherein the set of resources is allocated to exclude the one or more resources based at least in part on the detected sidelink feedback information.

10. The method of claim 9, wherein the sidelink feedback information comprises a negative acknowledgment.

11. The method of claim 8, further comprising:
    transmitting the second packet using the one or more resources based at least in part on the detected sidelink feedback information and allocating the set of resources to include the one or more resources.

12. The method of claim 11, wherein the sidelink feedback information comprises a positive acknowledgment.

13. The method of claim 1, further comprising:
    detecting that a reference signal received power associated with the one or more resources is below a configured threshold; and
    transmitting the second packet using the one or more resources based at least in part on the reference signal received power and allocating the set of resources to include the one or more resources.

14. The method of claim 1, wherein monitoring for the sidelink feedback information comprises:
    monitoring a physical sidelink feedback channel for the sidelink feedback information transmitted to the second UE.

15. The method of claim 1, wherein the plurality of categories for the one or more resources comprises an available category and an occupied category.

16. The method of claim 1, wherein the first UE and the second UE operate in a vehicle-to-everything system.

17. An apparatus for wireless communications at a first user equipment (UE), comprising:
    a processor,
    memory coupled with the processor; and
    instructions stored in the memory and executable by the processor to cause the apparatus to:
      receive, by the first UE, sidelink channel information indicating one or more resources reserved for retransmission of a first packet by a second UE;
      monitor for sidelink feedback information that is responsive to an initial transmission of the first packet by the second UE;
      identify a category of a plurality of categories for the one or more resources based at least in part on whether the sidelink feedback information is detected during the monitoring; and
      allocate, by the first UE, a set of resources for transmission of a second packet, wherein the one or more resources are included in the set of resources based at least in part on the identified category of the plurality of categories for the one or more resources.

18. The apparatus of claim 17, wherein the instructions are further executable by the processor to cause the apparatus to:
- determine an absence of the sidelink feedback information based at least in part on the monitoring, wherein identifying the category is based at least in part on the absence of the sidelink feedback information.

19. The apparatus of claim 18, wherein the instructions are further executable by the processor to cause the apparatus to:
- identify a first priority of the first packet; and
- identify a second priority of the second packet, wherein identifying the category of the one or more resources is based at least in part on a comparison of the first priority and the second priority.

20. The apparatus of claim 19, further comprising a transceiver, wherein the instructions are further executable by the processor to cause the apparatus to:
- identify that the first priority is equal to the second priority based at least in part on the comparison; and
- transmit, via the transceiver, the second packet using the one or more resources based at least in part on the first priority being equal to the second priority and allocating the set of resources to include the one or more resources.

21. The apparatus of claim 19, further comprising a transceiver, wherein the instructions are further executable by the processor to cause the apparatus to:
- identify that the first priority is less than the second priority based at least in part on the comparison; and
- transmit, via the transceiver, the second packet using the one or more resources based at least in part on the first priority being less than the second priority and allocating the set of resources to include the one or more resources.

22. The apparatus of claim 19, further comprising a transceiver, wherein the instructions are further executable by the processor to cause the apparatus to:
- determine that the first priority is higher than the second priority; and
- transmit, via the transceiver, the second packet using the set of resources, wherein the set of resources is allocated to exclude the one or more resources based at least in part on the first priority being higher than the second priority.

23. The apparatus of claim 17, wherein the instructions are further executable by the processor to cause the apparatus to:
- detect the sidelink feedback information based at least in part on the monitoring, wherein identifying the category is based at least in part on the detected sidelink feedback information.

24. The apparatus of claim 23, further comprising a transceiver, wherein the instructions are further executable by the processor to cause the apparatus to:
- transmit, via the transceiver, the second packet using the set of resources, wherein the set of resources is allocated to exclude the one or more resources based at least in part on the detected sidelink feedback information.

25. The apparatus of claim 23, further comprising a transceiver, wherein the instructions are further executable by the processor to cause the apparatus to:
- transmit, via the transceiver, the second packet using the one or more resources based at least in part on the detected sidelink feedback information and allocating the set of resources to include the one or more resources.

26. The apparatus of claim 17, further comprising a transceiver, wherein the instructions are further executable by the processor to cause the apparatus to:
- detect that a reference signal received power associated with the one or more resources is below a configured threshold; and
- transmit, via the transceiver, the second packet using the one or more resources based at least in part on the reference signal received power and allocating the set of resources to include the one or more resources.

27. The apparatus of claim 17, wherein the instructions to monitor for the sidelink feedback information are executable by the processor to cause the apparatus to:
- monitor a physical sidelink feedback channel for the sidelink feedback information transmitted to the second UE.

28. The apparatus of claim 17, wherein the plurality of categories for the one or more resources comprises an available category and an occupied category.

29. An apparatus for wireless communications at a first user equipment (UE), comprising:
- means for receiving, by the first UE, sidelink channel information indicating one or more resources reserved for retransmission of a first packet by a second UE;
- means for monitoring for sidelink feedback information that is responsive to an initial transmission of the first packet by the second UE;
- means for identifying a category of a plurality of categories for the one or more resources based at least in part on whether the sidelink feedback information is detected during the monitoring; and
- means for allocating, by the first UE, a set of resources for transmission of a second packet, wherein the one or more resources are included in the set of resources based at least in part on the identified category of the plurality of categories for the one or more resources.

30. A non-transitory computer-readable medium storing code for wireless communications at a first user equipment (UE), the code comprising instructions executable by a processor to:
- receive, by the first UE, sidelink channel information indicating one or more resources reserved for retransmission of a first packet by a second UE;
- monitor for sidelink feedback information that is responsive to an initial transmission of the first packet by the second UE;
- identify a category of a plurality of categories for the one or more resources based at least in part on whether the sidelink feedback information is detected during the monitoring; and
- allocate, by the first UE, a set of resources for transmission of a second packet, wherein the one or more resources are included in the set of resources based at least in part on the identified category of the plurality of categories for the one or more resources.

* * * * *